United States Patent
Jain et al.

(10) Patent No.: US 11,057,322 B1
(45) Date of Patent: Jul. 6, 2021

(54) RANKING MESSAGES OF CONVERSATION GRAPHS IN A MESSAGING PLATFORM USING MACHINE-LEARNING SIGNALS

(71) Applicant: Twitter, Inc., San Francisco, CA (US)

(72) Inventors: Rohit Jain, Seattle, WA (US); Arvind Thiagarajan, Seattle, WA (US); Xiangyi Zheng, San Francisco, CA (US); Minali Aggarwal, Oakland, CA (US); Allen Chen, San Francisco, CA (US); Tommy Chong, South San Francisco, CA (US); Andrew Hazen Schlaikjer, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/723,984

(22) Filed: Dec. 20, 2019

(51) Int. Cl.
| | |
|---|---|
| G06F 15/16 | (2006.01) |
| H04L 12/58 | (2006.01) |
| G06N 20/00 | (2019.01) |
| G06F 16/901 | (2019.01) |

(52) U.S. Cl.
CPC ........ *H04L 51/046* (2013.01); *G06F 16/9024* (2019.01); *G06N 20/00* (2019.01); *H04L 51/18* (2013.01); *H04L 51/32* (2013.01)

(58) Field of Classification Search
CPC ....... H04L 51/046; H04L 51/18; H04L 51/32; G06F 16/9024; G06N 20/00
USPC .................................................. 709/202–207
See application file for complete search history.

(56) References Cited

U.S. PATENT DOCUMENTS

| | | |
|---|---|---|
| 5,819,299 A | 10/1998 | Bejar |
| 5,848,412 A | 12/1998 | Rowland et al. |
| 6,275,811 B1 | 8/2001 | Ginn et al. |
| 6,631,351 B1 | 10/2003 | Ramachandran et al. |
| 6,985,933 B1 | 1/2006 | Singhal et al. |
| 7,363,590 B2 | 4/2008 | Kerr et al. |
| 7,546,131 B1 | 6/2009 | Sidi et al. |
| 7,752,649 B1 | 7/2010 | Harvey et al. |
| 7,830,925 B1 | 11/2010 | Harvey et al. |
| 8,185,558 B1 | 5/2012 | Narayanan et al. |
| 8,369,225 B2 | 2/2013 | Sun et al. |

(Continued)

OTHER PUBLICATIONS

International Search Report and Written Opinion for PCT Application No. PCT/US2020/070895, dated Mar. 24, 2021, 11 pages.

*Primary Examiner* — Bharat Barot
(74) *Attorney, Agent, or Firm* — Brake Hughes Bellermann LLP

(57) ABSTRACT

According to an aspect, a method for ranking messages of conversation graphs in a messaging platform using machine-learning signals includes receiving a conversation view request to retrieve messages of a conversation graph stored on a messaging platform and determining a plurality of predictive outcomes for each of a plurality of messages of the conversation graph using predictive models. The determining step may include obtaining a plurality of signals relevant to the predictive models, the plurality of signals including data structure-related signals relating to the conversation graph and inputting the plurality of signals to the predictive models. The method includes ranking the plurality of messages based on the predictive outcomes and transmitting at least a subset of the plurality of messages to be rendered on a client application according to the rank.

20 Claims, 10 Drawing Sheets

(56) References Cited

U.S. PATENT DOCUMENTS

| | | |
|---|---|---|
| 8,400,436 B1 | 3/2013 | Kuck et al. |
| 8,572,129 B1 | 10/2013 | Lee et al. |
| 8,601,019 B1 | 12/2013 | Weininger et al. |
| 8,612,882 B1 | 12/2013 | Secord et al. |
| 8,626,862 B2 | 1/2014 | Frank et al. |
| 8,645,332 B1 | 2/2014 | Cohen et al. |
| 8,775,517 B1 | 7/2014 | Goldman et al. |
| 9,143,468 B1 | 9/2015 | Cohen |
| 9,418,117 B1 | 8/2016 | Molina et al. |
| 9,424,359 B1 | 8/2016 | Hamadani et al. |
| 9,449,050 B1 | 9/2016 | Molina et al. |
| 10,229,218 B1 | 3/2019 | Cohen et al. |
| 10,263,924 B1 * | 4/2019 | Davidson ............... H04L 51/046 |
| 10,395,179 B2 * | 8/2019 | Cao ......................... H04L 51/32 |
| 10,545,966 B1 * | 1/2020 | Molina ................... H04L 51/32 |
| 2003/0041147 A1 | 2/2003 | van den Oord et al. |
| 2006/0059434 A1 | 3/2006 | Boss et al. |
| 2006/0075120 A1 | 4/2006 | Smit et al. |
| 2006/0168509 A1 | 7/2006 | Boss et al. |
| 2006/0200442 A1 | 9/2006 | Parikh et al. |
| 2006/0242109 A1 | 10/2006 | Pereira et al. |
| 2006/0259473 A1 | 11/2006 | Li et al. |
| 2008/0012701 A1 | 1/2008 | Kass et al. |
| 2008/0086534 A1 | 4/2008 | Bardak et al. |
| 2008/0209338 A1 | 8/2008 | Li et al. |
| 2008/0320411 A1 | 12/2008 | Chen et al. |
| 2009/0037527 A1 | 2/2009 | Hodges et al. |
| 2009/0203361 A1 | 8/2009 | Huang et al. |
| 2009/0210800 A1 | 8/2009 | McCann et al. |
| 2009/0234924 A1 | 9/2009 | Edelen et al. |
| 2009/0271700 A1 | 10/2009 | Chen et al. |
| 2009/0300491 A1 | 12/2009 | Wasmund et al. |
| 2009/0313346 A1 | 12/2009 | Sood et al. |
| 2010/0002685 A1 | 1/2010 | Shaham et al. |
| 2010/0017753 A1 | 1/2010 | Li et al. |
| 2010/0077041 A1 * | 3/2010 | Cowan .................... G06F 15/16 709/206 |
| 2010/0268597 A1 | 10/2010 | Bookstaff et al. |
| 2010/0273443 A1 | 10/2010 | Forutanpour et al. |
| 2010/0318538 A1 | 12/2010 | Wyman et al. |
| 2011/0173174 A1 | 7/2011 | Flitcroft et al. |
| 2011/0191693 A1 | 8/2011 | Baggett et al. |
| 2011/0238682 A1 | 9/2011 | Ootaki et al. |
| 2011/0264681 A1 | 10/2011 | Kimberlin et al. |
| 2011/0295878 A1 | 12/2011 | Bennett et al. |
| 2012/0059722 A1 | 3/2012 | Rao et al. |
| 2012/0150979 A1 | 6/2012 | Monaco et al. |
| 2012/0173243 A1 | 7/2012 | Anand et al. |
| 2012/0240062 A1 | 9/2012 | Passmore et al. |
| 2012/0271860 A1 | 10/2012 | Graham et al. |
| 2012/0284093 A1 | 11/2012 | Evans et al. |
| 2012/0311419 A1 | 12/2012 | Kwak et al. |
| 2012/0317097 A1 | 12/2012 | Tseng et al. |
| 2013/0036177 A1 | 2/2013 | Leeder et al. |
| 2013/0041916 A1 | 2/2013 | Biesecker et al. |
| 2013/0041949 A1 | 2/2013 | Biesecker et al. |
| 2013/0054632 A1 | 2/2013 | Van Dijk et al. |
| 2013/0072221 A1 | 3/2013 | Chen et al. |
| 2013/0110565 A1 | 5/2013 | Means et al. |
| 2013/0124542 A1 | 5/2013 | Lee et al. |
| 2013/0141513 A1 | 6/2013 | Setton et al. |
| 2013/0173718 A1 | 7/2013 | Bhat et al. |
| 2013/0282844 A1 | 10/2013 | Logan et al. |
| 2013/0304726 A1 | 11/2013 | Sandulescu et al. |
| 2014/0095418 A1 | 4/2014 | Scholand et al. |
| 2014/0095419 A1 | 4/2014 | Gandhi et al. |
| 2014/0129936 A1 | 5/2014 | Richards et al. |
| 2014/0143347 A1 | 5/2014 | Murarka et al. |
| 2014/0156744 A1 | 6/2014 | Hua et al. |
| 2014/0157145 A1 | 6/2014 | Bush et al. |
| 2014/0162598 A1 | 6/2014 | Villa-Real |
| 2014/0172565 A1 | 6/2014 | Alon et al. |
| 2014/0172845 A1 | 6/2014 | Rabe et al. |
| 2014/0244619 A1 | 8/2014 | Doroshenko et al. |
| 2014/0358947 A1 * | 12/2014 | Hong ............... G06F 16/24578 707/751 |
| 2015/0039582 A1 | 2/2015 | Liutikas et al. |
| 2015/0278346 A1 | 10/2015 | Aiello et al. |
| 2016/0070790 A1 | 3/2016 | Bhat et al. |
| 2017/0148055 A1 | 5/2017 | Boothroyd et al. |
| 2018/0367483 A1 | 12/2018 | Rodriguez et al. |
| 2019/0205743 A1 * | 7/2019 | Jiang ....................... H04L 51/16 |
| 2019/0243916 A1 * | 8/2019 | Ashoori .............. G06F 16/9024 |
| 2019/0362263 A1 | 11/2019 | Harris et al. |
| 2019/0392396 A1 | 12/2019 | Liu et al. |
| 2020/0143288 A1 | 5/2020 | Eisenzopf |
| 2020/0175964 A1 | 6/2020 | Eisenzopf |
| 2020/0186362 A1 * | 6/2020 | Thubert .................. H04L 45/30 |
| 2021/0026903 A1 * | 1/2021 | Grant ..................... H04L 51/22 |

* cited by examiner

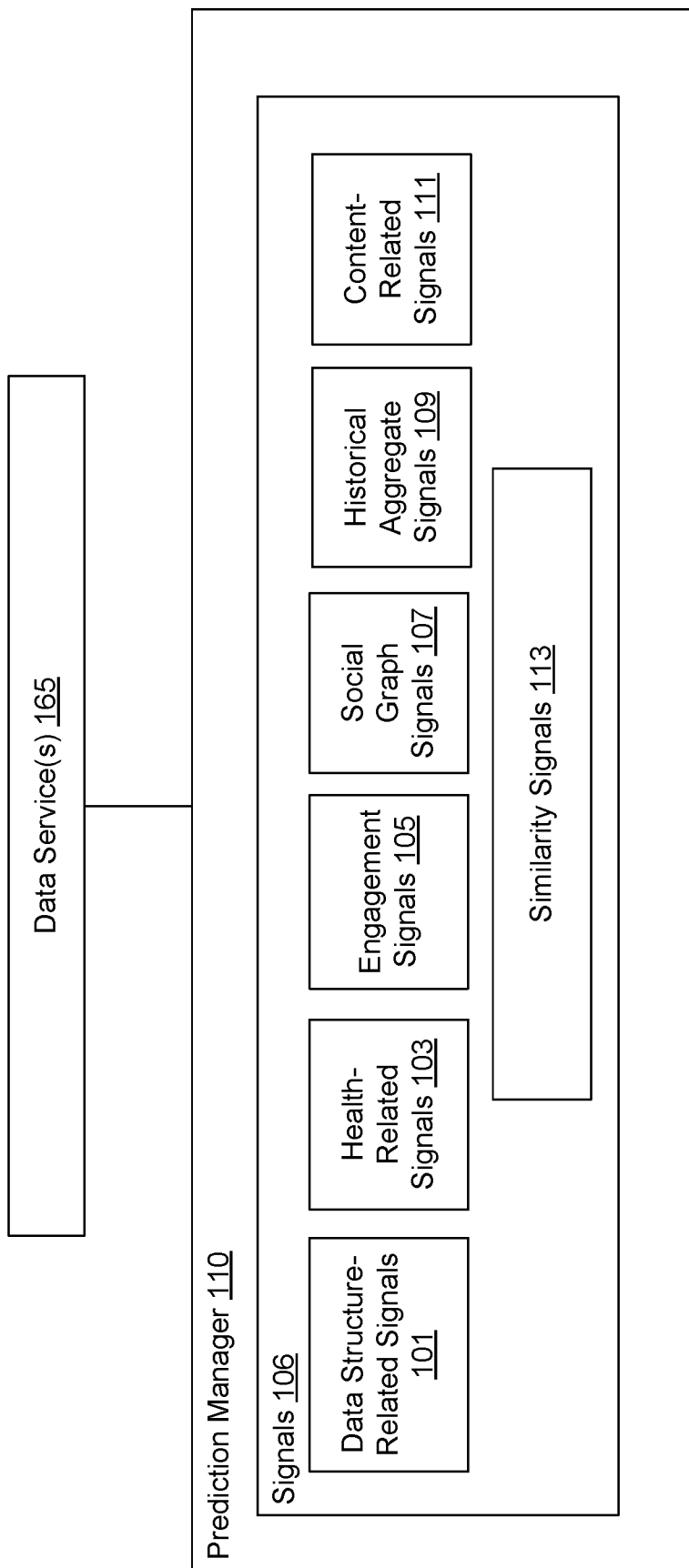

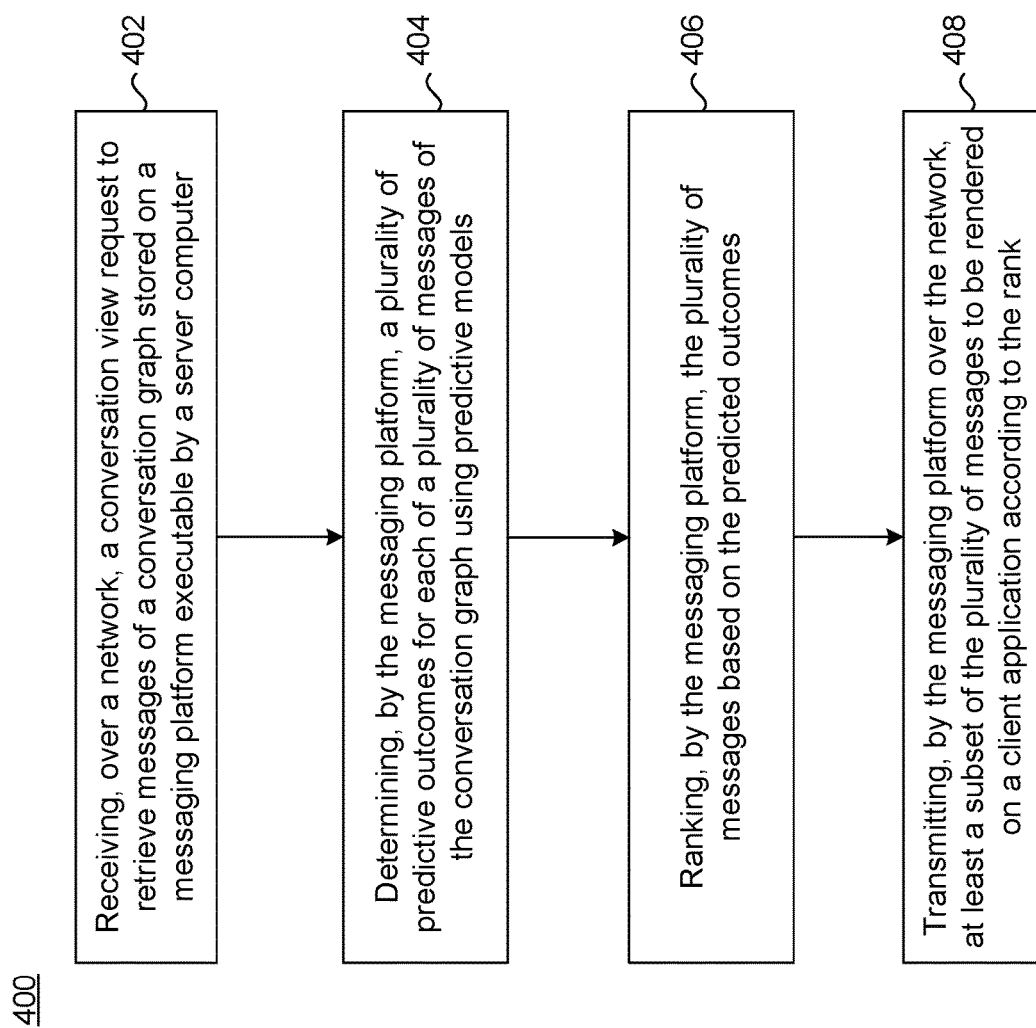

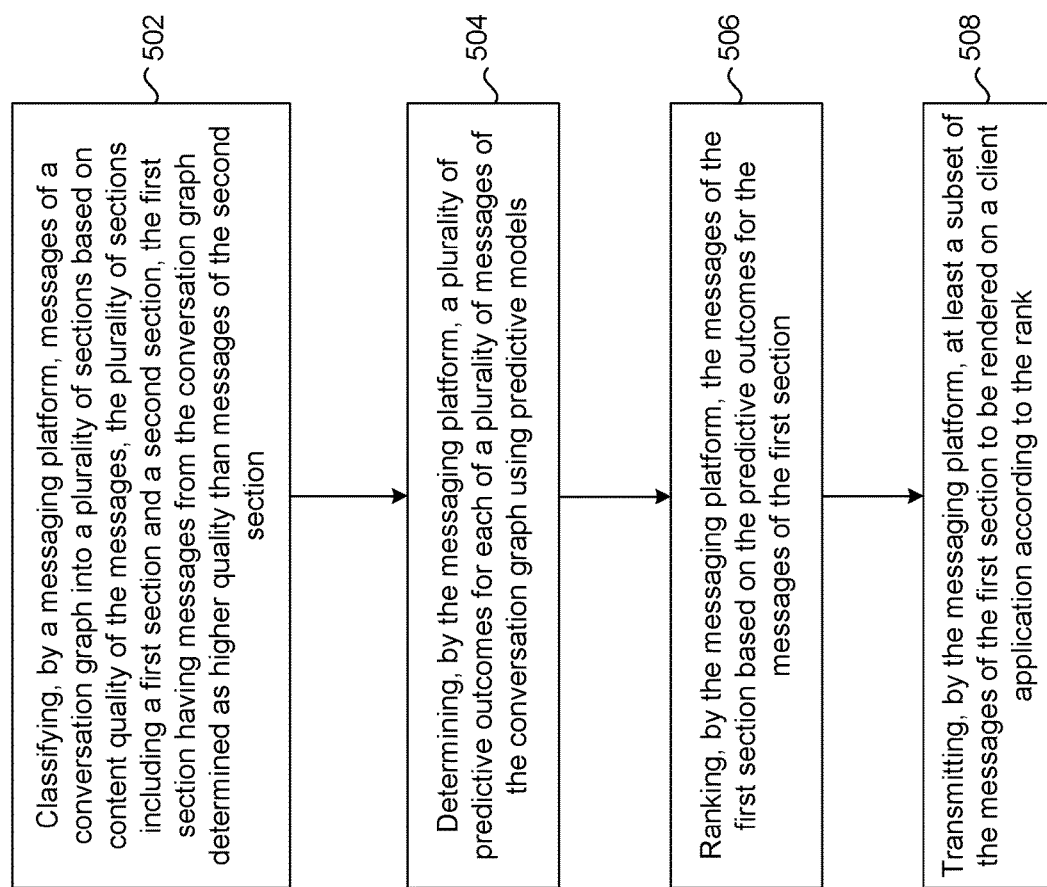

RANKING MESSAGES OF CONVERSATION GRAPHS IN A MESSAGING PLATFORM USING MACHINE-LEARNING SIGNALS

BACKGROUND

A social media messaging platform may facilitate the exchange of millions or hundreds of millions of social media messages among its users. The messages exchanged on the platform often can provide users of the platform the latest update or reporting on current events. The exchange of messages on the messaging platform may be part of a conversation between users. Some conventional messaging systems may store the reply structure of messages so that a user can view parts of the conversation when viewing a particular message. However, the list of messages that form the conversation view may be relatively large, which may lead to slower load times for the user.

SUMMARY

A messaging platform facilitates the exchanges of messages between users of the messaging platform. The messages may be part of a conversation occurring on the messaging platform. For example, a user may post a message on the platform, and other users may post a number of replies to that message, and then replies to the replies, and so forth. The reply structure may be stored as a conversation graph, and the messaging platform may store any number of conversation graphs that relate to conversations taking place on the messaging platform. In some examples, the conversation graph may be relatively large (e.g., a number of nodes in the conversation graph exceeding a threshold number). The generation and maintaining of the conversation graphs may enable faster retrieval of information when responding to requests to view messages in a reply relationship with a particular message.

When viewing a particular message associated with a conversation graph, the user may select a message to view other messages of the conversation graph, where the client application generates a conversation view request to the messaging platform. Rather than displaying all of the messages related to the conversation graph (which may be relatively large), a timeline manager may rank the messages of the conversation graph using a unique scoring system (that incorporates engagement predictions) to rank (and perhaps select) the most relevant branches (or nodes) for a specific user, and then provide that ranked list (or a subset thereof) on a user interface of the client application. In this manner, messages of a conversation graph are displayed according to their level of predictive outcomes (which balances positive predictive outcomes against negative predictive outcomes). In addition, providing a ranked list allows the messaging platform to increase the value provided to users while serving fewer responses. For example, the messaging platform may provide a subset of the responses (e.g., top 10, 15, 20, etc. responses) for each request, which may lead to faster computation on the server, faster load times for the user, and substantially without loss (e.g., any loss) on engagement.

A prediction manager (executing at the messaging platform) may determine, using one or more predictive models, predictive outcomes for each candidate node in the conversation graph. The predictive outcomes are user engagement outcomes that are predicted for each message (or a subset of messages) of the conversation graph. The predictive outcomes include a reciprocal engagement probability. The reciprocal engagement probability indicates a probability value that the user is predicted to further develop the conversation graph (e.g., predicted to reply to the message). The incorporation of the reciprocal engagement probability into the predictive outcomes may incentivize more conversations on the platform. In some examples, the predictive outcomes include the reciprocal engagement probability and at least one of a positive engagement probability or a negative engagement probability. The positive engagement probability indicates a probability value that the user is predicted to positively engage with the message (e.g., like or favoritize a node). The negative engagement probability indicates a probability value that the user is predicted to negatively view or engage with the message (e.g., the user may find a node abusive). In some examples, the predictive outcomes includes the reciprocal engagement probability, the positive engagement probability, and the negative engagement probability.

The predictive models may include a positive engagement model that predicts the positive engagement probability, a negative engagement model that predicts the negative engagement probability, and a reciprocal engagement model that predicts the reciprocal engagement probability. In some examples, the predictive models are machine learning models that are trained using training data applied to one or more machine learning algorithms. In some examples, the predictive models include neural networks. The training data may be a combination of historical data obtained from a client event log and an injection log while the messaging system is active (and the prediction manager enabled). The historical data may be obtained over a period of time (e.g., a day, week, month, year, etc.), and then used to train (or re-train) the predictive models in an offline mode, where the updated predictive models are transmitted to the prediction manager.

In response to a conversation view request to retrieve messages of the conversation graph, the prediction manager may obtain signals for determining the predictive outcomes and input the signals to the predictive models to determine the predictive outcomes. The signals may include signals generated by the client application and/or signals generated by the messaging platform. In some examples, the signals include the user and author's social graph and engagement history. However, the signals may include a wide variety of signals such as data structure-related signals, health-related signals, engagement signals, social graph signals, historical aggregate signals, and/or content-related signals. The number of signals and the number of different categories of signals used in the prediction may improve the accuracy of the model predictions.

The prediction manager may combine the predictive outcomes to obtain an engagement value for each node, where the engagement value indicates the overall level of predicted engagement with a message of the conversation graph. The timeline manager may use the engagement values to greedily select the most relevant branch(es) (or nodes) of the conversation graph for the user. In addition to locating the most relevant branch(es) (or nodes), the timeline manager may determine how much of the branch to display based on the engagement values. Furthermore, the timeline manager may collapse non-relevant parts of the conversation graph but allows the user to expand those parts to view other messages of the conversation graph.

The messages ranked according to the engagement values may be specific to each user. For example, some messages of the conversation graph may be more relevant to a first user while other messages of the conversation graph may be relevant to a second user. However, the predictive outcomes determined by the prediction manager are tailored to the specific user. In contrast, some conventional approaches use a voting-based mechanism that may provide the same view for each. In addition, because the messaging platform incorporates the reciprocal engagement probability within its scoring algorithm, the messaging platform may incentivize more conversations on the messaging platform.

In some examples, the messaging platform performs a two-level ranking system with respect to the messages of a conversation graph. For example, the two-level ranking mechanism (e.g., a hard ranking and a soft ranking) may provide an effective mechanism to handling abuse in conversations on the messaging platform. In some examples, the hard ranking includes classifying (or sectioning) the messages (or branches) of the conversation into a plurality of sections. For example, the messaging platform may include a content quality classifier that divides the nodes (or the branches) of the conversation graph into the sections. Each section may refer to a different categorization (or classification) of quality level. In some examples, the content quality classifier includes a classification model (e.g., a neural network) that determines the quality classification of the messages based on the content of the message and other signals related to the author's behavior, profile, or engagements on the messaging platform.

The content quality classifier may determine that a first message has a relatively low quality and a second message has a relatively high quality, where the content quality classifier may assign the first message (or a branch that includes the first message) to a first section (e.g., the first section being considered a low quality section), and may assign the second message (or a branch that includes the second message) to a second section (e.g., the second section being considered a high quality section). The soft ranking of the two-level ranking mechanism may include ranking the messages (or branches) within each section using the engagement values described above. Then, the messages are surfaced to the user in a manner that provides the ranked list of the high quality section, followed by the ranked list of the low quality section.

According to an aspect, a method for ranking messages of conversation graphs in a messaging platform using predictive outcomes includes receiving, over a network, a conversation view request to retrieve messages of a conversation graph stored on a messaging platform, and determining, by the messaging platform, a plurality of predictive outcomes for each of a plurality of messages of the conversation graph using predictive models. The plurality of predictive outcomes includes a reciprocal engagement probability. The method includes ranking, by the messaging platform, the plurality of messages based on the predictive outcomes, and transmitting, by the messaging platform, over the network, at least a subset of the plurality of messages to be rendered on a client application according to the rank. According to further aspects, a corresponding system and a non-transitory computer-readable medium storing corresponding instructions may be provided.

According to some aspects, the method, system, and/or the non-transitory computer-readable medium may include one or more of the following features (or any combination thereof). The plurality of predictive outcomes also include a positive engagement probability and a negative engagement probability. The method may further include computing an engagement value for each of the plurality of messages using the reciprocal engagement probability, the positive engagement probability, and the negative engagement probability, where the plurality of messages are ranked according to the engagement values. The method may include generating, by the messaging platform, the conversation graph based on a reply structure of messages exchanged on the messaging platform, where the conversation graph includes a tree data structure of messages relating to a conversation. The method may include obtaining, by the messaging platform, signals generated by at least one of the client application or the messaging platform, and inputting, by the messaging platform, the signals to the predictive models to determine the plurality of predictive outcomes. The method may include training, by the messaging platform, the predictive models based on a machine learning algorithm inputted with training data. The method may include selecting, by the messaging platform, a candidate subset from the plurality of messages in response to a number of messages in the conversation graph being greater than a threshold level, where the plurality of predictive outcomes are determined for each message of the candidate subset. The method may include transmitting, by the messaging platform, a first subset of the plurality of messages to be rendered on the client application according to the rank, receiving, by the messaging platform, a request to display additional messages from the conversation graph from the client application, and transmitting, by the messaging platform, a second subset of the plurality of messages to be rendered on the client application according to the rank. The conversation graph may include a tree data structure having an arrangement of a plurality of nodes that represent the messages of the conversation graph. The method may include computing, by the messaging platform, an engagement value for each of the plurality of messages based on the plurality of predictive outcomes, and selecting, by the messaging platform, one or more branches of the tree data structure using the engagement values.

According to an aspect, a system for ranking messages of conversation graphs in a messaging platform using predictive outcomes includes a conversation graph manager configured to generate a conversation graph based on a reply structure of messages exchanged on a messaging platform, where the conversation graph includes a data structure of messages of a conversation, a timeline manager configured to provide a stream of messages, over a network, in a timeline of a user on a client application, where the timeline manager is configured to receive a conversation view request, over the network, from the client application, an engagement predictor configured to determine, in response to the conversation view request, a plurality of predictive outcomes for each of a plurality of messages of the conversation graph using predictive models, where the plurality of predictive outcomes includes a reciprocal engagement probability and at least one of a positive engagement probability and a negative engagement probability, and an engagement scorer configured to compute an engagement value for each of the plurality of messages using the predictive outcomes for a respective message. The timeline manager is configured to rank the plurality of messages using the engagement values, and provide, over the network, at least a subset of the plurality of messages to be rendered on the timeline according to the rank. According to further aspects, a corresponding method and a non-transitory computer-readable medium storing corresponding instructions may be provided.

According to some aspects, the method, system, and/or the non-transitory computer-readable medium may include one or more of the above/below following features (or any combination thereof). The reciprocal engagement probability includes a probability value that the messaging platform is predicted to receive a reply to a message of the conversation graph, the positive engagement probability includes a probability value that the messaging platform is predicted to receive a positive user engagement with the message of the conversation graph, and the negative engagement probability includes a probability value that the messaging platform is predicted to receive a negative user engagement with the message of the conversation graph. The predictive models include a reciprocal engagement model, a positive engagement model, and a negative engagement model. The engagement predictor is configured to obtain signals generated by at least one of the client application or the messaging platform, and input the signals to the reciprocal engagement model, the positive engagement model, and the negative engagement model, to obtain the reciprocal engagement probability, the positive engagement probability, and the negative engagement probability, respectively. The system may include a predictive model trainer configured to periodically train the predictive models based on one or more machine learning algorithms inputted with training data, where the predictive model trainer is configured to provide the trained predictive models to the prediction manager. The system may include a candidate message selector configured to select a candidate subset from a plurality of sources, where the plurality of sources includes a first source having the messages of the conversation graph ranked according to most recently posted and a second source having the messages of the conversation graph ranked according to a relevancy algorithm. The candidate subset includes a number of messages from the first source and a number of messages from the second source, where the plurality of predictive outcomes are determined for each message of the candidate subset. The data structure of the conversation graph includes a tree data structure having an arrangement of a plurality of nodes that represent the messages of the conversation graph, where the timeline manager is configured to select a branch of the tree data structure using the engagement values. The engagement scorer is configured to apply weights to each the reciprocal engagement probability, the positive engagement probability, and the negative engagement probability such that a weight applied to the reciprocal engagement probability is higher than a weight applied to the negative engagement probability.

According to an aspect, a non-transitory computer-readable medium storing executable instructions that when executed by at least one processor are configured to cause the at least one processor to receive, over a network, a conversation view request for messages of a conversation graph stored on a messaging platform, where the conversation graph includes a data structure of messages of a conversation, select a candidate subset of messages from the conversation graph, determine a plurality of predictive outcomes for each message of the candidate subset using predictive model, where the plurality of predictive outcomes includes a reciprocal engagement probability, the reciprocal engagement probability including a probability value that the messaging platform is predicted to receive a reply to a respective message of the candidate subset, compute an engagement value for each message of the candidate subset using the predictive outcomes, rank the plurality of messages using the engagement values, and transmit at least a subset of the plurality of messages to be rendered on a client application according to the rank. According to further aspects, a corresponding system and method storing corresponding instructions may be provided.

According to some aspects, the method, system, and/or the non-transitory computer-readable medium may include one or more of the above/below following features (or any combination thereof). The candidate subset includes a number of most recently posted messages and a number of top-ranked messages from the conversation graph. The data structure of the conversation graph includes a tree data structure having an arrangement of a plurality of nodes that represent the messages of the conversation graph. The operations may include select a branch of the tree data structure using the engagement values. The operations may include periodically train the predictive models based on one or more machine learning algorithms inputted with training data and provide the trained predictive models to the prediction manager.

According to an aspect, a method for ranking messages of conversation graphs in a messaging platform using predictive outcomes includes receiving, over a network, a conversation view request to retrieve messages of a conversation graph stored on a messaging platform, and determining, by the messaging platform, a plurality of predictive outcomes for each of a plurality of messages of the conversation graph using predictive models. The determining step may include obtaining a plurality of signals relevant to the predictive models, the plurality of signals including data structure-related signals relating to the conversation graph and inputting the plurality of signals to the predictive models to determine the plurality of predictive outcomes. The method includes ranking, by the messaging platform, the plurality of messages based on the predictive outcomes, and transmitting, by the messaging platform over the network, at least a subset of the plurality of messages to be rendered on a client application according to the rank. According to further aspects, a corresponding system and a non-transitory computer-readable medium storing corresponding instructions may be provided.

According to some aspects, the method, system, and/or the non-transitory computer-readable medium may include one or more of the above/below following features (or any combination thereof). The conversation graph includes a tree data structure having a plurality of nodes that represent the messages of the conversation graph and edges that represent links between the nodes, where the tree data structure defines one or more branches of nodes, and the data structure-related signals includes signals representing a number of nodes and a number of branches within the conversation graph. The data structure-related signals include a number of replies within a branch, a number of conversations within a branch, and a number of unique authors within a branch or the conversation graph. The plurality of signals include signals representing whether a user of the client application has restricted an author of a message of the conversation graph. The plurality of signals include engagement signals representing user engagement data associated with the messages of the conversation graph including engagements of users that follow a user of the client application in a connection graph. The plurality of signals include historical aggregate signals including engagement data associated with a user of the client application on the messaging platform. The plurality of signals include content-related signals associated with messages of the conversation graph. At least a subset of the plurality of signals are obtained from one or more data services executing on the messaging platform. The method may include obtaining, by the messaging platform, training data from a client event log that stores information received from the client application and an injection log that stores information from a timeline manager executing on the messaging platform, and training, by the messaging platform, the predictive models based on a machine learning algorithm inputted with the training data.

According to an aspect, a system for ranking messages of conversation graphs in a messaging platform using predictive outcomes includes a conversation graph manager configured to generate a conversation graph based on a reply structure of messages exchanged on a messaging platform, where the conversation graph includes a data structure of messages of a conversation, a timeline manager configured to provide a stream of messages, over a network, in a timeline of a user on a client application, where the timeline manager is configured to receive a conversation view request, over the network, from the client application, and an engagement predictor configured to determine, in response to the conversation view request, a plurality of predictive outcomes for each of a plurality of messages of the conversation graph using predictive models. The engagement predictor is configured to obtain a plurality of signals relevant to the predictive models from one or more data services stored on the messaging platform, where the engagement predictor is configured to input the plurality of signals to the predictive models to determine the plurality of predictive outcomes. The system includes an engagement scorer configured to compute an engagement value for each of the plurality of messages using the predictive outcomes for a respective message, where the timeline manager is configured to rank the plurality of messages using the engagement values, and provide, over the network, at least a subset of the plurality of messages to be rendered on the timeline according to the rank. According to further aspects, a corresponding method and a non-transitory computer-readable medium storing corresponding instructions may be provided.

According to some aspects, the method, system, and/or the non-transitory computer-readable medium may include one or more of the above/below following features (or any combination thereof). The plurality of signals includes data structure-related signals relating to the conversation graph. The engagement predictor is configured to obtain one or more first signals from a first data service and obtain one or more second signals from a second data service. The plurality of signals include at least one health-related signals, engagement signals, social graph signals, historical aggregate signals, or content-related signals. The predictive models include a reciprocal engagement model, a positive engagement model, and a negative engagement model, where the engagement predictor is configured to input the signals to the reciprocal engagement model, the positive engagement model, and the negative engagement model, to obtain the reciprocal engagement probability, the positive engagement probability, and the negative engagement probability, respectively. The system includes a predictive model trainer configured to periodically train the predictive models based on one or more machine learning algorithms inputted with training data, where the predictive model trainer is configured to provide the trained predictive models to the prediction manager. The plurality of signals include signals generated by the client application and signals generated by the messaging platform. The plurality of signals include similarity signals.

According to an aspect, a non-transitory computer-readable medium storing executable instructions that when executed by at least one processor are configured to cause the at least one processor to receive, over a network, a conversation view request for messages of a conversation graph stored on a messaging platform, where the conversation graph includes a data structure of messages of a conversation, select a candidate subset of messages from the conversation graph. determine a plurality of predictive outcomes for each message of the candidate subset using predictive model, including obtain a plurality of signals including data structure-related signals relating to the conversation graph and input the plurality of signals to the predictive models to determine the plurality of predictive outcomes, compute an engagement value for each message of the candidate subset using the predictive outcomes, rank the plurality of messages using the engagement values, and transmit at least a subset of the plurality of messages to be rendered on a client application according to the rank. According to further aspects, a corresponding system and a method may be provided.

According to some aspects, the method, system, and/or the non-transitory computer-readable medium may include one or more of the above/below following features (or any combination thereof). The operations may include obtain training data from a client event log that stores information received from the client application and an injection log that stores information from a timeline manager executing on the messaging platform and train the predictive models based on a machine learning algorithm inputted with the training data. The plurality of signals include at least one health-related signals, engagement signals, social graph signals, historical aggregate signals, or content-related signals.

According to an aspect, a method for ranking messages of conversation graphs in a messaging platform include classifying, by a messaging platform, messages of a conversation graph into a plurality of sections based on content quality of the messages, where the plurality of sections include a first section and a second section. The first section has messages from the conversation graph determined as higher quality than messages of the second section. The method includes determining, by the messaging platform, a plurality of predictive outcomes for each of a plurality of messages of the conversation graph using predictive models, ranking, by the messaging platform, the messages of the first section based on the predictive outcomes for the messages of the first section, and transmitting, by the messaging platform, at least a subset of the messages of the first section to be rendered on a client application according to the rank. According to further aspects, a corresponding system and a non-transitory computer-readable medium storing corresponding instructions may be provided.

According to some aspects, the method, system, and/or the non-transitory computer-readable medium may include one or more of the above/below following features (or any combination thereof). The method includes ranking, by the messaging platform, the messages of the second section based on the plurality of predictive outcomes for the messages of the second section. In some examples, the method includes receiving, by the messaging platform, a request to render additional messages of the conversation graph on the client application, and transmitting, by the messaging platform, at least a subset of the messages of the second section to be rendered on a client application according to the rank. The classifying step may include receiving a message identifier of a message of the conversation graph and determining, using a classification model, that the message has a content quality corresponding to the first section. The method may include assigning a branch of the conversation graph that includes the message to the first section. The method may include computing an engagement value for each message of the conversation graph using the plurality of predictive outcomes of a respective message, where the messages of the first quality section are ranked according to engagement values of the messages of the first quality section. The predictive outcomes include a reciprocal engagement probability, a positive engagement probability, and a negative engagement probability. The method may include generating, by the messaging platform, the conversation graph based on a reply structure of messages exchanged on the messaging platform, the conversation graph including a tree data structure of messages relating to a conversation. The plurality of predictive models include a reciprocal engagement model, a positive engagement model, and a negative engagement model, at least one of the reciprocal engagement mode, the positive engagement model, or the negative engagement model including a neural network.

According to an aspect, a system for ranking messages of conversation graphs in a messaging platform includes a conversation graph manager configured to generate a conversation graph based on a reply structure of messages exchanged on a messaging platform, where the conversation graph includes a data structure of messages of a conversation, a timeline manager configured to provide a stream of messages, over a network, in a timeline of a user on a client application, where the timeline manager is configured to receive a conversation view request, over a network, from the client application, and a content quality classifier configured to classify the messages of the conversation graph into a plurality of sections based on content quality of the messages, where the plurality of sections include a first section and a second section. The first section has messages from the conversation graph determined as higher quality than messages of the second section. The system includes an engagement predictor configured to determine a plurality of predictive outcomes for each of a plurality of messages of the conversation graph using predictive models, and an engagement scorer configured to compute an engagement value for each of the plurality of messages using the plurality of predictive outcomes for a respective message. The timeline manager is configured to rank the messages of the first section using engagement values of the first section, and provide, over the network, at least a subset of the messages of the first section to be rendered on the timeline according to the rank. According to further aspects, a corresponding method and a non-transitory computer-readable medium storing corresponding instructions may be provided.

According to some aspects, the method, system, and/or the non-transitory computer-readable medium may include one or more of the above/below following features (or any combination thereof). The engagement predictor is configured to obtain a plurality of signals relevant to the predictive models from one or more data services stored on the messaging platform, the engagement predictor configured to input the plurality of signals to the predictive models to determine the plurality of predictive outcomes. The plurality of signals include data structure-related signals relating to the conversation graph. The timeline manager is configured to separately rank the messages of the second section using engagement values of the second section. The content quality classifier is configured to receive a message identifier of a message of the conversation graph and determine, using a classification model, that the message has a content quality corresponding to the first quality section. The plurality of predictive outcomes include a reciprocal engagement probability, where the reciprocal engagement probability includes a probability value that the messaging platform is predicted to receive a reply to a respective message of the conversation graph. The system may include a predictive model trainer configured to periodically train the predictive models based on one or more machine learning algorithms inputted with training data, where the predictive model trainer is configured to provide the trained predictive models to the prediction manager.

According to an aspect, a non-transitory computer-readable medium storing executable instructions that when executed by at least one processor are configured to cause the at least one processor to classify, using a classification model, messages of a conversation graph into a plurality of sections based on content quality of the messages, where the plurality of sections include a first section and a second section and the first section has messages from the conversation graph determined as higher quality than messages of the second section, determine, using one or more predictive models, a plurality of predictive outcomes for each of a plurality of messages of the conversation graph, where the plurality of predictive outcomes includes a reciprocal engagement probability, a positive engagement probability, and a negative engagement probability, rank the messages of the first section based on the plurality of predictive outcomes for the messages of the first section, rank the messages of the second section based on the plurality of predictive outcomes for the messages of the second section, and transmit at least a subset of the messages of the first quality section to be rendered on a client application according to the rank. According to further aspects, a corresponding system and a method may be provided.

According to some aspects, the method, system, and/or the non-transitory computer-readable medium may include one or more of the above/below following features (or any combination thereof). The operations include obtain training data from a client event log that stores information received from the client application and an injection log that stores information from a timeline manager executing on a messaging platform and train the predictive models based on a machine learning algorithm inputted with the training data. The operations may include receive a message identifier of a first message of the conversation graph, determine, using the classification model, that the first message has a content quality corresponding to the first section, receive a message identifier of a second message of the conversation graph, and determine, using the classification model, that the second message has a content quality corresponding to the second section. The operations may include receive a request to render additional messages of the conversation graph on the client application and transmit at least a subset of the messages of the second section to be rendered on a client application according to the rank. These and other features are further discussed in the detailed disclosure.

BRIEF DESCRIPTION OF DRAWINGS

FIG. 1C illustrates examples of signals used for determining predictive outcomes according to an aspect.

FIG. 4 illustrates a flowchart depicting example operations of the messaging system according to an aspect.

FIG. 5 illustrates a flowchart depicting example operations of the messaging system according to an aspect.

DETAILED DISCLOSURE

Figure 1A:
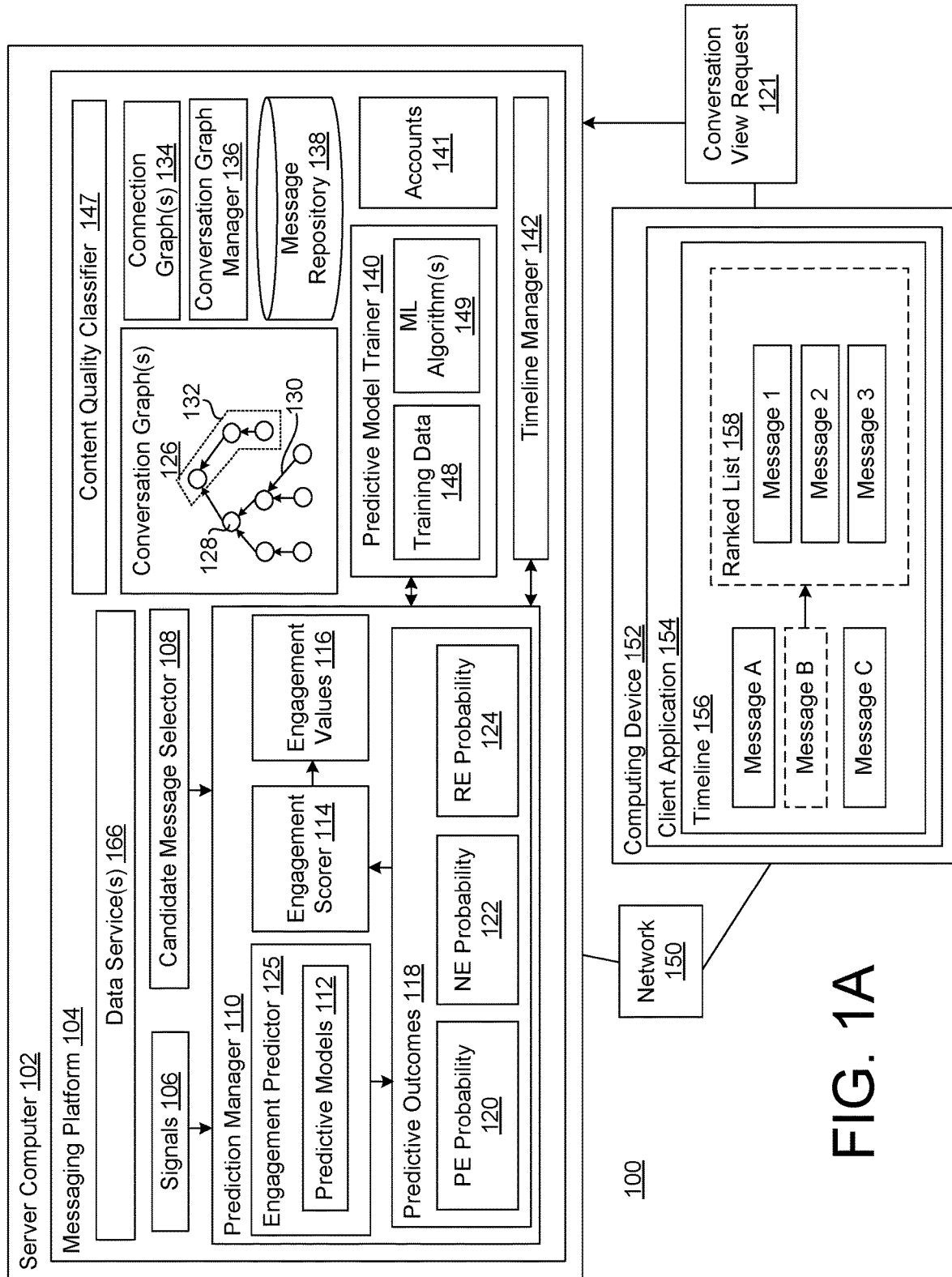
FIG. 1A illustrates a messaging system for ranking messages of conversation graphs using predictive outcomes from predictive models according to an aspect.

FIGS. 1A through 1E illustrate a messaging system 100 for ranking messages of conversation graphs 126 using predictive outcomes 118 from predictive models 112 according to an aspect. The messaging system 100 includes a messaging platform 104 executable by a server computer 102, and a client application 154 executable by a computing device 152 according to an aspect. The client application 154 communicates with the messaging platform 104 to send (and receive) messages, over a network 150, to (and from) other users of the messaging platform 104.

The client application 154 may be a social media messaging application in which users post and interact with messages. In some examples, the client application 154 is a native application executing on an operating system of the computing device 152 or may be a web-based application executing on the server computer 102 (or other server) in conjunction with a browser-based application of the computing device 152. The computing device 152 may access the messaging platform 104 via the network 150 using any type of network connections and/or application programming interfaces (APIs) in a manner that permits the client application 154 and the messaging platform 104 to communicate with each other.

The computing device 152 may be a mobile computing device (e.g., a smart phone, a PDA, a tablet, or a laptop computer) or a non-mobile computing device (e.g., a desktop computing device). The computing device 152 also includes various network interface circuitry, such as for example, a mobile network interface through which the computing device 152 can communicate with a cellular network, a Wi-Fi network interface with which the computing device 152 can communicate with a Wi-Fi base station, a Bluetooth network interface with which the computing device 152 can communicate with other Bluetooth devices, and/or an Ethernet connection or other wired connection that enables the computing device 152 to access the network 150.

The server computer 102 may be a single computing device or may be a representation of two or more distributed computing devices communicatively connected to share workload and resources. The server computer 102 may include at least one processor and a non-transitory computer-readable medium that stores executable instructions that when executed by the at least one processor cause the at least one processor to perform the operations discussed herein.

The messaging platform 104 is a computing platform for facilitating communication (e.g., real-time communication) between user devices (one of which is shown as computing device 152). The messaging platform 104 may store millions of accounts 141 of individuals, businesses, and/or entities (e.g., pseudonym accounts, novelty accounts, etc.). One or more users of each account 141 may use the messaging platform 104 to send messages to other accounts 141 inside and/or outside of the messaging platform 104. In some examples, the messaging platform 104 may enable users to communicate in "real-time", e.g., to converse with other users with minimal delay and to conduct a conversation with one or more other users during simultaneous sessions. In other words, the messaging platform 104 may allow a user to broadcast messages and may display the messages to one or more other users within a reasonable time frame (e.g., less than two seconds) to facilitate a live conversation between users. In some examples, recipients of a message may have a predefined graph relationship in a connection graph 134 with an account of the user broadcasting the message.

The connection graph 134 includes a data structure that indicates which accounts 141 in the messaging platform 104 are associated with (e.g., following, friends with, subscribed to, etc.) a particular account 141 and are, therefore, subscribed to receive messages from the particular account 141. For example, the connection graph 134 may link a first account with a second account, which indicates that the first account is in a relationship with the second account. The user of the second account may view messages posted on the messaging platform 104 by the user of the first account (and/or vice versa). The relationships may include unidirectional (e.g., follower/followee) and/or bidirectional (e.g., friendship). The messages can be any of a variety of lengths which may be limited by a specific messaging system or protocol.

In some examples, users interested in viewing messages authored by a particular user can choose to follow the particular user. A first user can follow a second user by identifying the second user as a user the first user would like to follow. After the first user has indicated that they would like to follow the second user, the connection graph 134 is updated to reflect the relationship, and the first user will be provided with messages authored by the second user. Users can choose to follow multiple users. Users can also respond to messages and thereby have conversations with one another. In addition, users may engage with messages such as sharing a message with their followers or favoritizing (or "liking") a message in which the engagement is shared with their followers.

Messages exchanged on the messaging platform 104 are stored in message repository 138. The message repository 138 may include one or more tables storing records. In some examples, each record corresponds to a separately stored message. For example, a record may identify a message identifier for the message posted to the messaging platform 104, an author identifier (e.g., @tristan) that identifies the author of the message, message content (e.g., text, image, video, and/or URL of web content), one or more participant account identifiers that have been identified in the body of the message, and/or reply information that identifies the parent message for which the message replies to (if the message is a reply to a message).

The messaging platform 104 includes a conversation graph manager 136 that generates the conversation graphs 126, and a timeline manager 142 that injects a timeline 156 of messages into the client application 154. The messaging platform 104 includes a candidate message selector 108 that selects a candidate subset 133 of messages from the conversation graph 126. The messaging platform 104 includes a prediction manager 110 that obtains signals 106 related to the prediction and inputs the signals 106 into one or more predictive models 112 to determine predictive outcomes 118. In some examples, the prediction manager 110 computes engagement values 116 based on the predictive outcomes 118, and the timeline manager 142 uses the engagement values 116 to rank (and select) the messages of the conversation graph 126 and provides a ranked list 158 of messages to the client application 154. The messaging platform 104 includes a predictive model trainer 140 that obtains training data 148 and trains predictive models 112 using one or more machine learning algorithms 149 inputted with the training data 148.

In further detail, the conversation graph manager 136 generates (and updates) one or more conversation graphs 126 as messages are exchanged on the messaging platform 104. In some examples, the conversation graphs 126 are stored in a data storage device associated with the messaging platform 104. In some examples, the conversation graphs 126 are stored at the timeline manager 142. The messaging platform 104 may store multiple conversation graphs 126 (e.g., hundreds, thousands, or millions of conversation graphs 126). Each conversation graph 126 may represent a structure of replies to an original, non-reply message (e.g., a root message). For example, whenever a user creates and posts an original, non-reply message on the messaging platform 104, a potential new conversation may be started. Others can then reply to that original or "root" message and create their own reply branches. Over time, if the number of replies to the original, non-reply message (and/or replies to the replies to the original, non-reply message) is greater than a threshold level, the conversation graph manager 136 may assign a conversation identifier to the conversation graph 126, and the conversation identifier may uniquely identify the conversation graph 126. In some examples, the conversation graph manager 136 may assign a conversation identifier to each message with a reply. For example, if the messaging platform has message A, and then someone responds to it with a message B, then message A is assigned a conversation identifier that can be used to identify a conversation, which leads to the conversation graph 126 as discussed in detail below. In some examples, if there is a reply to a message, then there is a conversation.

The conversation graph 126 may be a hierarchical data structure representing the messages in a conversation. In some examples, the conversation graph 126 includes a nonlinear or linear data structure. In some examples, the conversation graph 126 includes a tree data structure. The conversation graph 126 may include nodes 128 (or vertices) representing messages and edges 130 (or arcs) representing links between nodes 128. The conversation graph 126 may store the message identifier of the respective message at each node 128. In some examples, the conversation graph 126 stores a user identifier of the author of a respective message at each node 128. The conversation graph 126 may define one or more branches 132 of nodes 128. In some examples, a branch 132 is a portion (e.g., a sub-tree) of the conversation graph 126 that includes one or more nodes 128. In some examples, a branch 132 may be at least two nodes 128 connected by an edge 130, where one of the nodes 128 is a leaf node. In some examples, a branch 132 may be defined as the messages that are connected in a single line (e.g., a leaf message, a first parent message connected to the leaf message, a second parent message connected to the first parent message and so forth until a parent message does not have another parent message).

It is noted that the term "node" may be referred to as a message within the conversation graph 126, or the term "message" may be referred to as a node 128 if that message is included as part of the conversation graph 126. A particular node 128 may be linked to another node 128 via an edge 130, and the direction of the edge 130 identifies the parent message. The nodes 128 may represent a root message, messages in reply to the root message, messages in reply to the messages in reply to the root message, etc.

The conversation graph manager 136 may generate the conversation graph 126 based on a reply structure of the messages. The reply structure may be identified based on metadata associated with each message and/or reply information identified from within the message content. In some examples, the reply structure is identified based on metadata associated with each message which is received from the client application 154 to compose the message. For example, a user may click on a reply link displayed below a message displayed on the user interface of the client application 154. The client application 154 may then display a message composition box for drafting a reply message. The client application 154 may submit metadata including the reply relationship (e.g., a message identifier of the parent message) with the reply message. In some examples, the reply relationship may be explicitly defined by the user within the message content (e.g., identifying a user account 141 (e.g., @tristan) within the body of the message). In this example, the reply structure may be identified by identifying one or more account identifiers and/or message identifiers mentioned within the body of the message.

The timeline manager 142 may send digital information, over the network 150, to enable the client application 154 to render and display a timeline 156 of social content on the user interface of the client application 154. The timeline 156 includes a stream of messages (e.g., message A, message B, message C). In some examples, the stream of messages are arranged in reverse chronological order. In some examples, the stream of messages are arranged in chronological order. In some examples, the timeline 156 is a timeline of social content specific to a particular user. In some examples, the timeline 156 includes a stream of messages curated (e.g., generated and assembled) by the messaging platform 104. In some examples, the timeline 156 includes a list of messages that resulted from a search on the messaging platform 104. In some examples, the timeline 156 includes a stream of messages posted by users from accounts 141 that are in relationships with the account 141 of the user of the client application 154 (e.g., a stream of messages from accounts 141 that the user has chosen to follow on the messaging platform 104). In some examples, the stream of messages includes promoted messages or messages that have been re-shared.

When viewing the messages on the timeline 156, the user may select one of the messages (e.g., message B) from the timeline 156, which may cause the client application 154 to generate and send a conversation view request 121, over the network 150, to the messaging platform 104. In some examples, the selected message (e.g., message B) may be referred to as a context message or focal message that may serve as an entry point or point of reference within the conversation graph 126. The conversation view request 121 may be a request to retrieve messages from the conversation graph 126. In some examples, the conversation view request 121 includes the message identifier of the selected messages and the user identifier of the user of the client application 154. In some examples, the conversation view request 121 also includes the time of the request, which device the user is on, the operating system (OS) version, and/or other metadata associated with the request.

In response to the conversation view request 121, the timeline manager 142 may control the prediction manager 110 to generate predictive outcomes 118 for each message (or a subset thereof) of the conversation graph 126 and compute an engagement value 116 for each message based on the predictive outcomes 118. For example, the prediction manager 110 includes an engagement predictor 125 and an engagement scorer 114. In response to the conversation view request 121, the engagement predictor 125 may obtain signals 106 related to the prediction and input the signals 106 to the predictive models 112 to determine the predictive outcomes 118 for each message (or a subset of messages) in the conversation graph 126. In some examples, the predictive outcomes 118 includes a reciprocal engagement probability 124. In some examples, the predictive outcomes 118 includes a reciprocal engagement probability 124, and at least one of a positive engagement probability 120 or a negative engagement probability 122. In some examples, the predictive outcomes 118 include the reciprocal engagement probability 124, the positive engagement probability 120, and the negative engagement probability 122.

The engagement scorer 114 may compute an engagement value 116 for a respective message using the predictive outcomes 118 (e.g., combining the predictive outcomes 118 to generate the engagement value 116). The engagement values 116 are used by the timeline manager 142 to rank the messages of the conversation graph 126, and the timeline manager 142 may provide the messages (or a subset of the messages of the conversation graph 126), over the network 150, as the ranked list 158 within the user's timeline 156. The ranked list 158 (e.g., message 1, message 2, message 3) may include some or all of the messages of the conversation graph 126, which are ranked according to the engagement values 116 which are determined by the predictive outcomes 118.

In some examples, the candidate message selector 108 selects a portion of the messages of the conversation graph 126 to be analyzed by the prediction manager 110. In other words, the candidate message selector 108 may select candidate messages from the larger number of messages included in the conversation graph 126, where the candidate messages are the messages subject to the predictive analysis by the prediction manager 110. In some examples, the conversation graph 126 is relatively large, and if the number of nodes 128 included in the conversation graph 126 is above a threshold level (e.g., above 3000 or 4000 messages), the candidate message selector 108 may select a subset of the nodes 128 (instead of all of the nodes 128) for further analysis by the prediction manager 110. In other words, if the number of nodes 128 is above the threshold level, the candidate message selector 108 may identify a subset of nodes 128, and the identification of those nodes 128 are provided to the prediction manager 110 to perform the prediction. This may reduce (e.g., significantly reduce) technical resource consumption and allow the messaging platform 104 to deliver more quality responses. For example, if a conversation graph 126 has thirty thousand responses (or nodes 128), but, using the techniques described above, the messaging platform 104 may select the top X amount of messages (e.g., X may be 3000), collect the signals on them, and then score them to select the top Y amount of messages (e.g., Y may be 10) to display to the user, which may reduce (e.g., significantly reduce) the amount of computational resources without impacting quality of the responses delivered to the user.

Figure 1B:
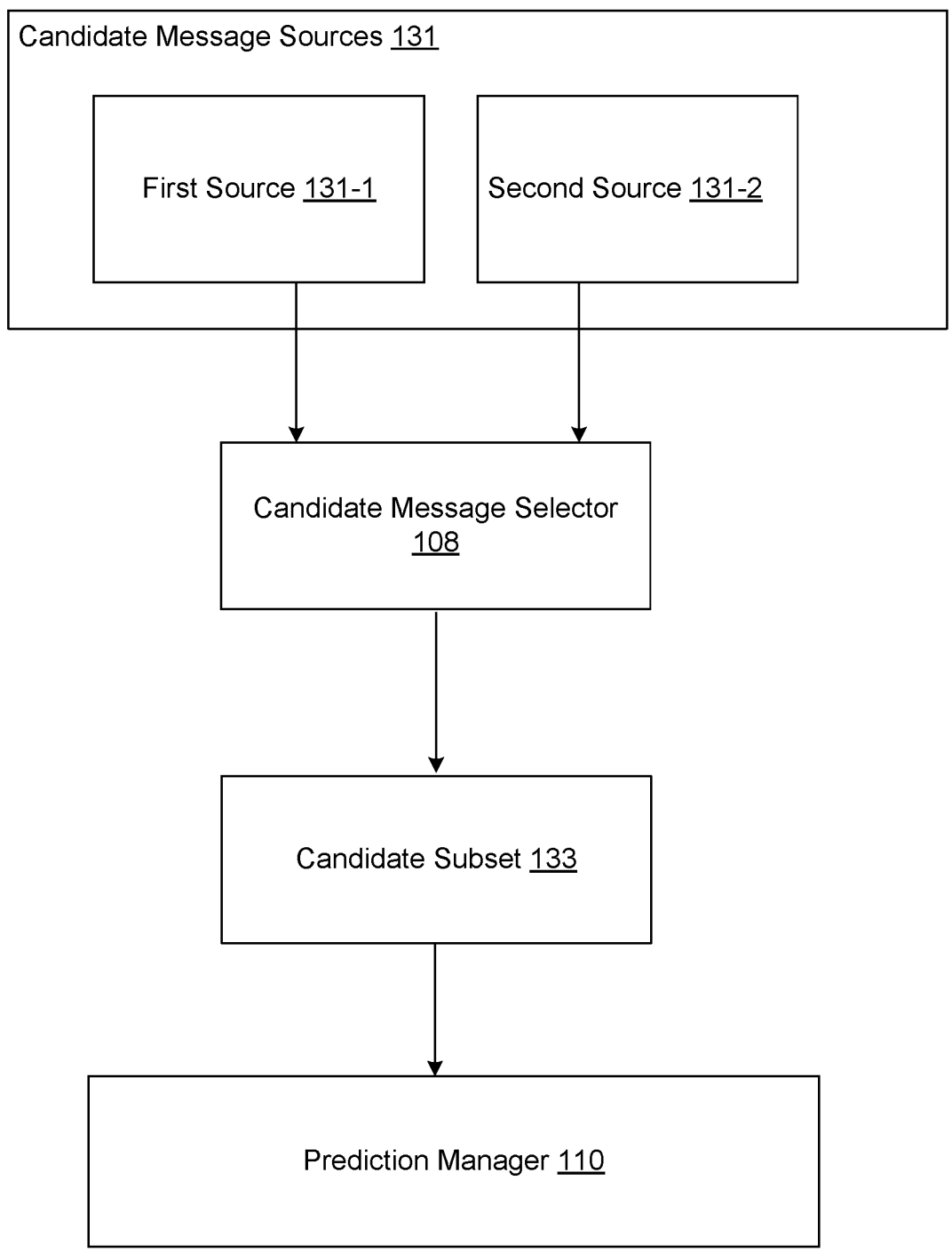
FIG. 1B illustrates a candidate message selector of the messaging system according to an aspect.

For example, referring to FIG. 1B, the candidate message selector 108 may select a candidate subset 133 from the conversation graph 126 in response to a number of messages in the conversation graph 126 being greater than a threshold level, where the predictive outcomes 118 are determined for each message of the candidate subset 133. In some examples, the candidate subset 133 includes a number of messages that are less than the total number of messages in the conversation graph 126. In some examples, the candidate message selector 108 selects the candidate subset 133 from one or more candidate message sources 131. In some examples, the candidate message selector 108 may merge in candidates for the conversation view from multiple sources. For example, the candidate message selector 108 selects a first set of messages included in the conversation graph 126 from a first source 131-1 and a second set of messages included in the conversation graph 126 from a second source 131-2, where the candidate subset 133 includes the first and second sets of messages.

In some examples, the first source 131-1 includes the messages of the conversation graph 126 ranked according to most recently posted. In some examples, the candidate message selector 108 selects a number (n) of the most recent messages (e.g., temporal order) in the conversation graph 126 from the first source 131-1. In some examples, the number (n) is in a range of 2000 to 4500. In some examples, the number (n) is in a range of 2500 to 3500. In some examples, the second source 131-2 includes messages of the conversation graph 126 ranked according to a relevancy algorithm (e.g., heuristic algorithm). In some examples, the relevancy ranking for the second source 131-2 is based on whether the messages in the conversation graph 126 are from user accounts 141 linked to the user account 141 of the user of the client application 154. In some examples, the relevancy algorithm uses signals such as the amount of engagements received, the numbers of likes, comments, and/or re-shares, signals representing message metadata, such as whether the message has a photo, video, and/or link, and/or signals representing author metadata and health related metadata such as if the message is toxic, NSFW or the author of the message was reported recently. The candidate message selector 108 selects a number (p) of top-ranked messages in the conversation graph 126 from the second source 131-2. In some examples, the number (p) is in a range of 200 to 1500. In some examples, the number (p) is in a range of 500 to 1000. In some examples, the number (p) is less than the number (n). The candidate subset 133 may include a number (n) of messages from the first source 131-1 and a number (p) of messages from the second source 131-2, where the predictive outcomes 118 are determined for each message of the candidate subset 133.

For at least some of the nodes 128 (or all of the nodes 128) in the conversation graph 126 (or the ones identified by the candidate message selector 108), the engagement predictor 125 may predict, using the predictive models 112, the positive engagement probability 120, the negative engagement probability 122, and/or the reciprocal engagement probability 124 for a respective message. For example, in response to the conversation view request 121, the prediction manager 110 may control the engagement predictor 125 to obtain the signals 106 and apply the signals 106 to the predictive models 112 to determine the predictive outcomes 118 for the selected nodes 128 of the conversation graph 126.

The prediction manager 110 may obtain the signals 106 from one or more data services 165. The data service(s) 165 may be components on the messaging platform 104 that compute or otherwise derive data obtained by the messaging platform 104 and/or the client application 154. In some examples, the prediction manager 110 may communicate with the data services 165 over a server communication interface. In some examples, the prediction manager 110 may obtain at least some of the signals 106 from the data service(s) 165 via one or more APIs. In some examples, in response to the conversation view request 121, the prediction manager 110 may transmit a thrift call or a remote procedure call (RPC) to data service(s) 165 and then receive at least some of the signals 106 from the relevant data service(s) 165. In some examples, the prediction manager 110 may transmit a representational state transfer (REST) request to the data service(s) 165 and then receive at least some of the signals 106 from the relevant data service(s) 165. In some examples, the prediction manager 110 communicates with the data service(s) 165 via a GraphQL request. In some examples, the prediction manager 110 obtains some of the signals 106 from other components of the messaging platform 104 including the conversation graph manager 136 and/or the timeline manager 142.

The signals 106 may include signals generated by the messaging platform 104 and/or generated by the client application 154 that relate to predicting user outcomes for displaying messages on the client application 154. For example, the signals 106 may include signals generated by the client application 154 based on the user's interaction with the client application 154. The signals generated by the client application 154 may be transmitted to the messaging platform 104 for storage thereon. The signals generated by the client application 154 may include signals representing engagement information such as positive user engagements with messages (e.g., favoritizing, likes, re-sharing), and/or negative user engagements with the messages (e.g., the reporting of abusive content). In some examples, the signals 106 may include signals generated by the messaging platform 104. In some examples, the signals generated by the messaging platform 104 may include signals representing data generated from the user's connection graph 134, data generated from the conversation graph 126, data generated from user behavior on the platform (e.g., the number of times a user has engagement with messages, etc.), and/or data generated from the content of the messages such as the result of a semantic analysis that predicts user sentiment or the result of a topical analysis that determines a topic of one or more messages.

As shown in FIG. 1C, the signals 106 may include data structure-related signals 101 relating to a conversation graph 126, health-related signals 103 related to the health of providing messages from the conversation graph 126 to the user of the client application 154, engagement signals 105 related to user engagements on the messages of the conversation graph 126, social graph signals 107 related to data from the user's connection graph 134, historical aggregate signals 109 related to data aggregated by the messaging platform 104, content-related signals 111 related to the content of the messages of the conversation graph 126, and/or similarity signals 113 representing how similar a message is to other messages that the user has favoritized or liked and/or how similar the user is to other users that have engaged with the message. However, the signals 106 may include any type of category or granularity of signals that relate to predicting user outcomes from displaying messages.

The data structure-related signals 101 may include signals related to data from the conversation graph 126. In some examples, the data structure-related signals 101 may include signals representing the number of nodes 128, the number of edges 130, the number of branches 132, the length or size of each branch 132, the number of parent nodes, the number of children nodes, the number of leaf nodes, the height of the conversation graph 126 (e.g., the length of the longest path to a leaf node), and/or the depth of a node (e.g., the depth of a node is the length of the path to the root node). In some examples, the data structure-related signals 101 include one or more signals representing the number of unique authors in the conversation graph 126 or a subset of the conversation graph 126 such as a branch 132. In some examples, the data structure-related signals 101 include signals representing a location of a message having a certain type of data (e.g., an image, video, a link to video, etc.) within the conversation graph 126. In some examples, with respect to a particular message within the conversation graph 126, the data structure-related signals 101 may include signals representing whether the message is a child node, whether the message is a parent node, whether the message is a leaf node, the location of the message within the conversation graph 126, the location of a branch 132 that includes the message, the size of the branch 132 that includes the message, the depth of the message within the conversation graph 126.

The data structure-related signals 101 may include branch contextual features. In some examples, the data structure-related signals 101 include signals representing the number of replies within a branch 132, the number of conversations within a branch 132, the number of conversations within a branch 132 between the user of the client application 154 and an author of the root message, the number of conversation within a branch 132 between the user of the application 154 and a user mentioned in a new message, and/or the number of conversations between a specific node (e.g., a focal message) and a leaf node. In some examples, with respect to branch contextual features, a conversation may be defined as a back and forth between at least two users. In some examples, a conversation may be defined as a message posted by user A, a reply posted by user B, and then a reply posted by user A.

In some examples, the conversation graph manager 136 may receive the conversation identifier from the prediction manager 110, and then derive or determine the data structure-related signals 101 from the conversation graph 126 according to the conversation identifier and may store the data structure-related signals 101 in a data storage on the messaging platform 104. In some examples, in response to the conversation view request 121, the prediction manager 110 may control the conversation graph manager 136 to derive or determine the data structure-related signals 101 and then receive the data structure-related signals 101 from the conversation graph manager 136 to be used with the predictive models 112 to determine the predictive outcomes 118. In some examples, the prediction manager 110 may derive or determine the data structure-related signals 101 from the conversation graph 126. In some examples, in response to the conversation view request 121, the prediction manager 110 may transmit the conversation identifier to the conversation graph manager 136, and then receive the conversation graph 126 to derive or determine the data structure-related signals 101 from the conversation graph 126.

The health-related signals 103 may include signals that represent the health of presenting a message of the conversation graph 126 to the user of the client application 154. In some examples, the health-related signals 103 may include signals representing whether the user of the client application 154 has restricted (e.g., block, muted, etc.) an author of a message in the conversation graph 126 in the past. The health-related signals 103 may be stored in a data storage on the messaging platform 104. In some examples, the prediction manager 110 may transmit a request to a data service 165 (e.g., a health data service) to obtain the health-related signals 103, where the request may include the message identifiers of the messages of the conversation graph 126 and/or the user identifier of the user of the client application 154.

The engagement signals 105 may represent user engagement data associated with the messages of the conversation graph 126. In some examples, the engagement signals 105 include signals representing the number of engagements (e.g., number of times the messages has been favoritized or liked, the number or replies to the message, the number of times the message has been re-shared) with respect to a message of the conversation graph 126. In some examples, the engagement signals 105 include one or more signals representing the engagements of users that follow the user of the client application 154 in the user's connection graph 134 (e.g., whether the message has one or more engagements provided by users that follow the user of the client application 154 in the user's connection graph 134). In some examples, the prediction manager 110 obtains the engagement signals 105 from a data service 168 that stores the engagement data. In some examples, the prediction manager 110 may transmit a request that may include the message identifiers of the conversation graph 126, and the prediction manager 110 may receive the engagement signals 105 from the data service 165.

The social graph signals 107 may include signals representing information from the connection graph 134. In some examples, the social graph signals 107 includes signals representing the number of times that the user of the client application 154 has favoritized or liked messages of an author of a message over a period of time, whether the user is linked to the author of a message in the connection graph 134, and/or the number of times that the user has re-shared or replied messages of an author of a message over a period of time. In some examples, the prediction manager 110 obtains the social graph signals 107 from a data service 168 that stores the social graph signals. In some examples, the prediction manager 110 may transmit a request that may include a user identifier of the user of the client application 154, and the prediction manager 110 may receive the social graph signals 107 from the data service 165.

The historical aggregate signals 109 may include signals representing a user behavior on the messaging platform 104. In some examples, the historical aggregate signals 109 may include signals representing the number of times the user of the client application 154 has favoritized messages on the messaging platform 104 during a period of time, the number of times the user of the client application 154 has re-shared messages on the messaging platform 104 during a period of time, and/or the number of times the user of the client application 154 has replied to messages on the messaging platform 104 during a period of time. The period of time may be within the last day, last month, or last year, etc. In some examples, the historical aggregate signals 109 may include signals representing the number of times the user of the client application 154 has favoritized, liked, re-shared, and/or replied to messages that include an image or video.

In some examples, the historical aggregate signals 109 may include signals representing the number of times that the user of the client application 154 has favoritized, liked, re-shared, and/or replied to messages that are from accounts 141 linked to the user in the connection graph 134, and/or the number of times that the user has favoritized, liked, re-shared, and/or replied to messages that are from accounts 141 not linked to the user in the connection graph 134. In some examples, the prediction manager 110 obtains the historical aggregate signals 109 from data storage on the messaging platform 104. In some examples, the prediction manager 110 transmits a request to a data service 165 to obtain the historical aggregate signals 109. In some examples, the request includes a user identifier of the user of the client application 154. In some examples, the historical aggregate signals 109 includes batch aggregate information and real-time aggregate information. The batch aggregate information may include a relatively long history (e.g., greater than 50 days). In some examples, the batch aggregate information may not include interaction from last day (or last few days). The real-time aggregate information may include relatively recent interaction history (e.g., within the last 30 minutes or so).

The content-related signals 111 may include signals representing one or more aspects of the contents of a message of the conversation graph 126. In some examples, the content-related signals 111 may include signals representing the length of the message, and/or whether the content includes text, video, or image. In some examples, the prediction manager 110 obtains the content-related signals 111 from data storage on the messaging platform 104. In some examples, the prediction manager 110 transmits a request to a data service 165 to obtain the content-related signals 111. In some examples, the request includes message identifiers of the messages of the conversation graph 126.

The similarity signals 113 may include one or more signals representing how similar a message is to other messages that the user has favoritized or liked. For example, the similarity signals 113 may represent a level of similarity between a particular message and one or more other messages that the user has favoritized or liked, and if the level of similarity is relatively high, it may provide an indication of a potential positive engagement. In some examples, the similarity signals 113 may include one or more signals representing how similar the user is to other users that have engaged with the message. For example, if a user profile of the user is determined as relatively similar to user profiles that have engaged with the message, it may provide an indication of a potential positive engagement. In some examples, the prediction manager 110 may obtain the similarity signals 113 from data storage on the messaging platform 104. In some examples, the prediction manager 110 may transmit a request to a data service 165 to obtain the similarity signals 113. In some examples, the request may include message identifiers and/or user identifier of the user.

In some examples, technical difficulties or hurdles exist in order to obtain at least some of the signals 106 used for the prediction (e.g., especially for signals related to viewer-author relationships whenever a message goes viral). Popular messages may have a relatively large amount of responses (e.g., in some cases, more than 80K). This also means that many users may try and view the popular message at the same time. For each viewer, the messaging platform 104 may obtain their relationship with all the authors that have replied to the popular message. Using the techniques described above with respect to the candidate message selector 108, the messaging platform 104 may be able to filter the total number of messages from 80K to 4K, which may still mean that there can be 4K viewer author pairs for which to obtain relationship signals.

Also, in some examples, the viewer author relationship may not even exist because the viewer would not be following the author. To handle these types of situations, instead of querying by viewer-author as a key to a data service 166, the messaging platform 104 can query by the viewer identifier and get their relationships with all other authors at once. Then, the messaging platform 104 can determine if any authors overlap with the authors of the replies and keep the signals where relevant. This reduces over the network calls by a relatively large magnitude as instead of making 4K calls per viewer, the prediction manager 110 may generate and send one call.

Another technical difficulty may exist for message-level signals. For example, for large conversations, the messaging platform 104 may query other data services 166 with 4K queries for each viewer. This could lead to "hot-key" problems where the data service 166 receives too many queries for the same message identifier. To overcome the above-identified difficulty, the messaging platform 104 may use in-memory caching. The service would cache the features in memory if the underlying data service 166 indicates a hot-key. For example, a message T goes viral and has responses R1, R2 . . . R4000, and the message feature is the number of characters in the message. Then, 1000 users send requests for the same message simultaneously (or around the same time). If the data service 166 indicates a hot-key, the messaging platform 104 can store the character value for R1, R2 . . . R4000 each in memory for a very short duration and just use them instead of calling the data service 166 for each user.

The predictive models 112 are predictive models trained by one or more machine learning algorithms 149 inputted with training data 148. The machine learning algorithms 149 may include one or more of Markov models, logistic regression, decision tree analysis, random forest analysis, neural nets, and combinations thereof. Generally, machine learning is the field where a computer learns to perform classes of tasks using the feedback generated from experience or data that the machine learning process acquires during computer performance of those tasks. In supervised machine learning, the computer can learn one or more rules or functions to map between example inputs and desired outputs as predetermined by an operator or programmer. Labeled data points can then be used in training the computer. Unsupervised machine learning can involve using unlabeled data, and the computer can then identify implicit relationships in the data, for example by reducing the dimensionality of the data set.

Figure 1D:
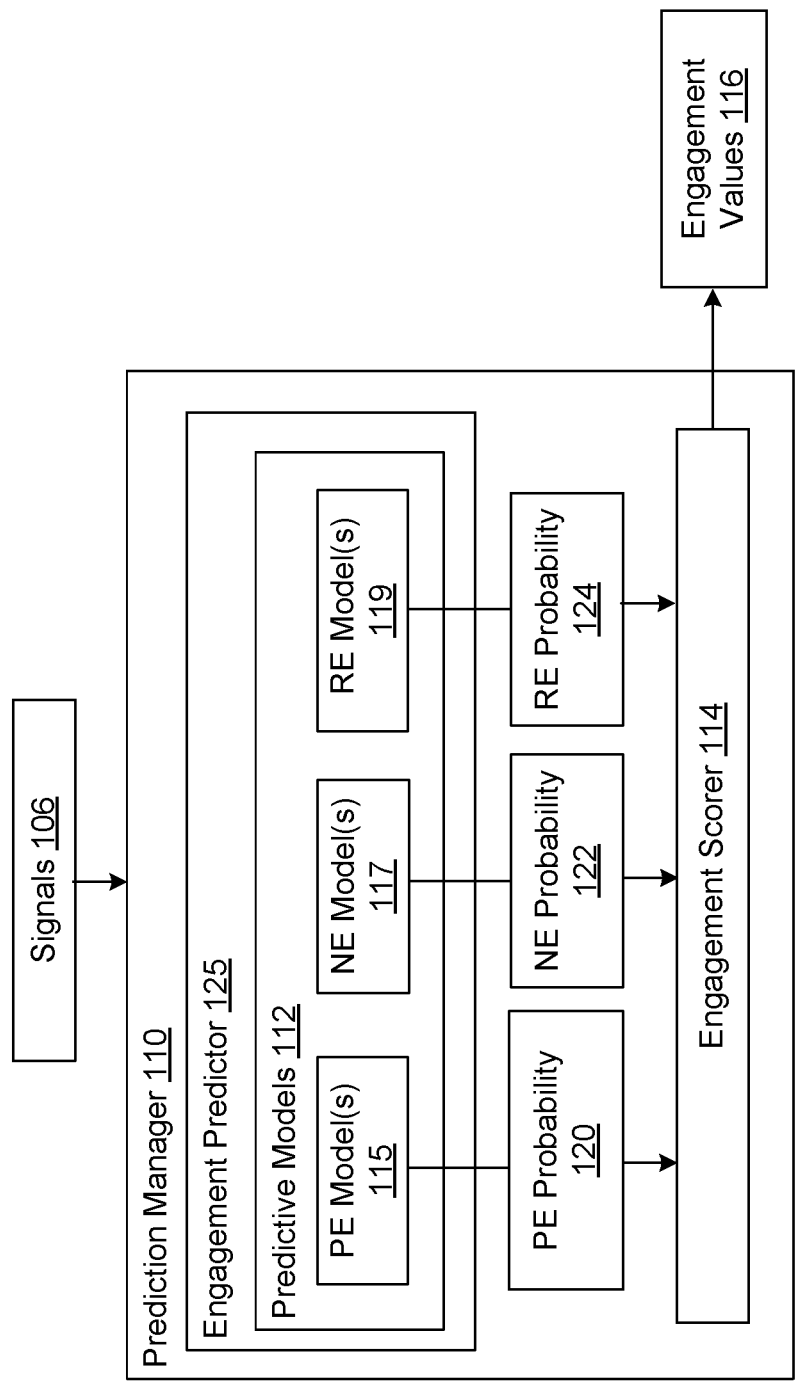
FIG. 1D illustrates a prediction manager of the messaging system according to an aspect.

As shown in FIG. 1D, the predictive models 112 may include a positive engagement model 115, a negative engagement model 117, and a reciprocal engagement model 119. The positive engagement model 115 is configured to compute the positive engagement probability 120, the negative engagement model 117 is configured to compute the negative engagement probability 122, and the reciprocal engagement model 119 is configured to compute the reciprocal engagement probability 124. For example, in response to the conversation view request 121 (e.g., the user selecting message B), the engagement predictor 125 may obtain the signals 106 and apply the signals 106 (which also includes the user identifier and the message identifier) to the positive engagement model 115, the negative engagement model 117, and/or the reciprocal engagement model 119 to determine the positive engagement probability 120, the negative engagement probability 122, and/or the reciprocal engagement probability 124, respectively.

The positive engagement probability 120 indicates a probability value that the user is predicted to positively view or engage with the message. In some examples, the probability value for the positive engagement probability 120 is a number (x) between a first value and a second value, where the first value represents a zero chance that the user is predicted to positively view or engage with the message, and the second value represents a 100% chance that the user is predicted to positively view or engage with the message. In some examples, the probability value for the positive engagement probability 120 is a positive number. In some examples, the first value is zero and the second value is one. However, the values for the first value and the second value may define any type of range (e.g., 0 to 1, 0 to 50, 0 to 100, etc.). In other words, the positive engagement probability 120 indicates a level of likeliness that the user is predicted to favoritize, like, or share the message.

The negative engagement probability 122 indicates a probability value that the user is predicted to negatively view or engage with the message. In some examples, the probability value for the negative engagement probability 122 is a number (y) between a first value and a second value, where the first value represents a zero chance that the user is predicted to negatively view or engage with the message, and the second value represents a 100% chance that the user is predicted to negatively view or engage with the message. In some examples, the probability value for the negative engagement probability 122 is a negative number. In some examples, the first value is zero and the second value is negative one. However, the values for the first value and the second value may define any type of range (e.g., 0 to −1, 0 to −50, 0 to −100, etc.). In some examples, the negative engagement probability 122 indicates a level of likeliness that the user is predicted to block the author of the message, unfollow the author of the message, and/or report the message as abusive.

The reciprocal engagement probability 124 indicates a probability value that the user is predicted to continue to develop the conversation graph 126. In some examples, the probability value for the reciprocal engagement probability 124 is a number (z) between a first value and a second value, where the first value represents a zero chance that the user is predicted to continue to develop the conversation graph 126, and the second value represents a 100% chance that the user is predicted to continue to develop the conversation graph 126. In some examples, the probability value for the reciprocal engagement probability 124 is a positive number. In some examples, the first value is zero and the second value is one. However, the values for the first value and the second value may define any type of range (e.g., 0 to 1, 0 to 50, 0 to 100, etc.). In some examples, the reciprocal engagement probability 124 indicates a level of likeliness that the user is predicted to reply to the message, thereby further developing the conversation graph 126.

With respect to a particular candidate node 128, the engagement predictor 125 may determine, using the positive engagement model 115, that the message has a certain probability of receiving a positive engagement by the user, determine, using the negative engagement model 117, that the message has a certain probability of receiving a negative engagement by the user, and determine, using the reciprocal engagement model 119, that the message has a certain probability of receiving a reciprocal engagement by the user. In some example, for each candidate node 128, the engagement predictor 125 determines all three predictive outcomes 118. In some examples, for each node 128, the engagement predictor 125 predicts the reciprocal engagement probability 124 and at least one of the positive engagement probability 120 or the negative engagement probability 122.

The engagement scorer 114 computes the engagement values 116 for the messages in the conversation graph 126 using the predictive outcomes 118. The engagement value 116 may provide an overall engagement value for a respective node 128 (e.g., indicating a level of relevance for the user of the client application 154), which incentivizes more healthy conversations on the messaging platform 104. For example, with respect to a particular candidate node 128, the engagement scorer 114 may combine the positive engagement probability 120, the negative engagement probability 122, and the reciprocal engagement probability 124 to provide an engagement value 116, which can be used to select the most relevant nodes 128 for the user. For example, the engagement scorer 114 may combine the values of the predictive outcomes 118 to determine the engagement value 116 for a particular message. If the probability value of the negative engagement probability 122 is relatively high (e.g., having a greater negative value), this value may offset the positive values of the positive engagement probability 120 and the reciprocal engagement probability 124. In a simple example, if the positive engagement probability 120 is +10, the negative engagement probability 122 is −10, and the reciprocal engagement probability 124 is +10, the engagement value 116 for the message is +10.

In some examples, the engagement scorer 114 may apply weights with the predictive outcomes 118, and then compute the engagement value 116 based on the weighted positive engagement probability 120, the negative engagement probability 122, and the reciprocal engagement probability 124. In some examples, the weight applied to the reciprocal engagement probability 124 is greater than the weight applied to the negative engagement probability 122.

The engagement values 116 are used to select relevant messages or branches of messages within the conversation graph 126 to be rendered to the user. For example, the timeline manager 142 receives the engagement values 116 from the prediction manager 110 and uses the engagement values 116 to rank the messages in the conversation graph 126 (e.g., from highest to lowest). The timeline manager 142 may provide, over the network 150, at least a subset of the messages of the conversation graph 126 to be rendered on the timeline 156 according to the rank. In some examples, the timeline manager 142 provides only a subset of the messages of the conversation graph 126 to be rendered on the timeline 156, where the subset includes the higher ranked messages of the conversation graph 126. Then, the timeline manager 142 may receive a request for additional messages of the conversation graph 126 from the client application 154 (e.g., selects a user affordance to view more messages of the conversation graph 126), and the timeline manager 142 may select the next group of messages from the conversation graph 126 to be transmitted to the client application 154. In this manner, the messaging system 100 may collapse parts of the conversation graph 126 that are less likely to provide a positive engagement, but then surface those messages when requested by the user.

In some examples, the timeline manager 142 selects one or more branches 132 (or a subset of a branch 132) of the conversation graph 126 to be rendered on the timeline 156 using the engagement values 116. For example, if a branch 132 includes one or more nodes 128 having high engagement values 116 (or engagement values 116 over a threshold level), the timeline manager 142 may select the entire branch 132 to be rendered as part of the messages delivered to the client application 154 despite the fact that the branch 132 may include one or more nodes 128 having low engagement values 116 (or engagement values 116 below a threshold level) in order to provide the user more context about the conversation. In some examples, a particular branch 132 is associated with an overall engagement value which may be the average of the engagement values 116 for the nodes 128 within the particular branch 132. Then, the timeline manager 142 may rank the branches 132 according to their overall engagement values.

In some examples, the timeline manager 142 selects nodes 128 having high engagement values (or engagement values 116 over a threshold level) for inclusion in the set of messages provided to the client application 154. In some examples, the timeline manager 142 ranks the selected branches 132 and/or the nodes 128 according to highest to lowest engagement values 116 (e.g., where the branches 132 or the nodes 128 having the highest engagement values 116 are presented to the user first). Because the messaging platform 104 incorporates (or predicts) the reciprocal engagement probability 124 within its scoring algorithm, the messaging platform 104 incentivizes more conversations on the messaging platform 104.

In some examples, the ranked list 158 represents a subset of the messages of the conversation graph 126 that are determined as relevant to the user. For example, some messages of the conversation graph 126 may be relevant to a first user while other messages of the conversation graph 126 may be relevant to a second user. In contrast, some conventional approaches use a voting-based mechanism that may provide the same view for each. In further detail, the engagement predictor 125 may obtain the signals 106 (e.g., engagement history, connection graph data, etc.) that are related to the first user and obtain the predictive outcomes 118 for each message in the conversation graph 126, which are then used to compute the engagement values 116. The timeline manager 142 may receive the engagement values 116 from the prediction manager 110, and then rank the messages of the conversation graph 126 using the engagement values 116 (which may increase the chances that the user will continue the conversation (e.g., by virtue of incorporating the reciprocal engagement probability 124)).

However, with respect to the second user, the engagement predictor 125 may obtain the signals 106 related to the second user, obtain the predictive outcomes 118 that are tailored to the second user, which are then used to compute the engagement values 116. Then, the timeline manager 142 may rank the messages in the conversation graph 126 using the engagement values 116. As such, the messages of the ranked list 158 that are displayed on the client application 154 for the second user may be different than the messages of the ranked list 158 that are displayed on the client application 154 for the first user.

The messaging platform 104 includes a predictive model trainer 140 that trains the predictive models 112 (e.g., the positive engagement model 115, the negative engagement model 117, and the reciprocal engagement model 119) and provides the trained predictive models 112 to the engagement predictor 125 so that the engagement predictor 125 can determine the predictive outcomes 118 when determining conversation views. In some examples, the predictive model trainer 140 is configured to periodically execute (e.g., daily, weekly, monthly) in order to re-train (and thereby) update the predictive models 112. In some examples, the predictive model trainer 140 operates in an offline mode to train the predictive models 112 using the training data 148, and then sends the predictive models 112 to the prediction manager 110 to be used in an online mode when the prediction manager 110 is active. In some examples, the predictive model trainer 140 sends the weights and biases of the positive engagement model 115, the negative engagement model 117, and the reciprocal engagement model 119 to the prediction manager 110.

In some examples, the predictive model trainer 140 executes on the server computer 102. In some examples, the predictive model trainer 140 executes on a computing device that is separate from the server computer 102, where the predictive model trainer 140 and the engagement predictor 125 communicate with each other via a networking interface. As shown in FIG. 1D, the predictive model trainer 140 trains the predictive models 112 using training data 148 in accordance with one or more machine learning algorithms 149. The training data 148 may include one or more (or any combination) of data discussed with respect to the signals 106, which data may be historic data from a previous period of time, for example, data from a past day, past month, past year, etc. For example, the training data 148 include data structure-related signals 101, health-related signals 103, engagement signals 105, social graph signals 107, historical aggregate signals 109, and content-related signals 111.

Figure 1E:
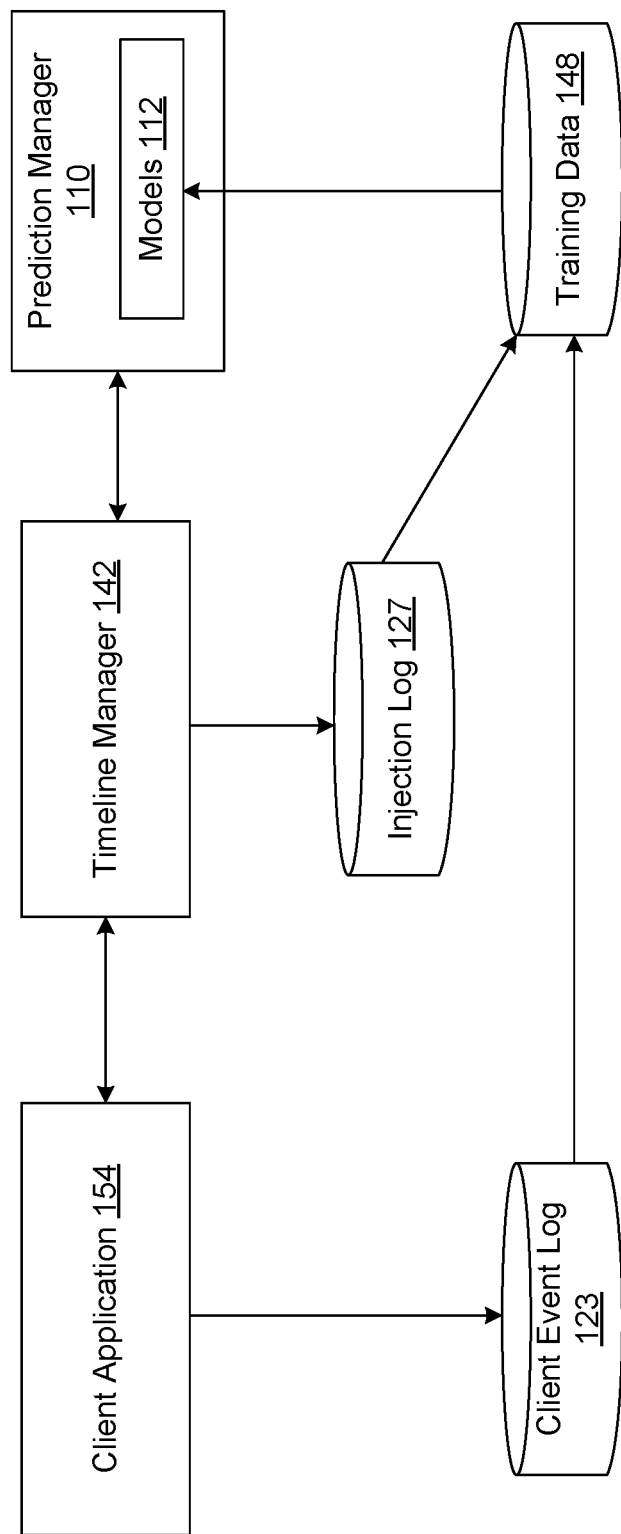
FIG. 1E illustrates an example of generating training data for the predictive models according to an aspect.

FIG. 1E illustrates an example of obtaining training data 148 to train the predictive models 112 according to an aspect. For example, the timeline manager 142 may inject a stream of messages to the client application 154. As part of one or more stream injections, the timeline manager 142 may store information about the message injections in an injection log 127. The injection log 127 may identify which messages were provided to the client application 154 and may identify certain features associated with the injections. In some examples, the features may include information related to any of the above described signals 106. In addition, the injection log 127 may include details about the prediction manager 110 such as the predictive outcomes 118 and/or engagement values 116 associated with messages of one or more conversation graphs 126. As the users interactive with messages on the client application 154, a client event log 123 stores user engagement information such as whether the user has replied to messages, favoritized or liked certain messages, re-shared messages, etc. In some examples, the client event log 123 includes information such as whether a message had a photo or a video, and/or if the message came from a certain depth in the conversation graph 126. The information in the client event log 123 may be transmitted to the messaging platform 104 for storage thereon. The training data 148 may include the information from the client event log 123 and the information from the injection log 127, and the training data 148 is used to train the predictive models 112. In some examples, the predictive model trainer 140 periodically trains the predictive models 112 in an offline analysis, and sends the results of the training (e.g., the weights/biases) to the prediction manager 110.

In some examples, the messaging platform 104 is configured to perform a two-level ranking mechanism with respect to the messages of a conversation graph 126. For example, the two-level ranking may provide an effective mechanism to handling abuse in conversations on the messaging platform 104. In some examples, the two-level ranking includes a hard ranking and a soft ranking. In some examples, the hard ranking includes sectioning the messages of the conversation graph 126 into different sections (or groups) based on a level of confidence that the message and/or the author is considered abusive. In some examples, the hard ranking is not personalized from the perspective of the user requesting the conversation view request 121. Rather, the hard ranking may be performed using signals about the content itself and/or signals about the author of the message. In some examples, the soft ranking includes computing the predictive outcomes 118 and generating the engagement values 116 for the messages in the conversation graph 126, and then ranking the messages in each section according to the engagement values 116. In some examples, as explained above, the soft ranking is personalized from the perspective of the user requesting the conversation view request 121. In this manner, messages from a higher quality section are presented to the user which are ranked according to the engagement values 116. In some examples, the hard ranking is performed first, which is then followed by the soft ranking. However, in some examples, the hard ranking can be personalized by using the output of the predictive models 112 to perform the hard ranking.

Figure 1F:
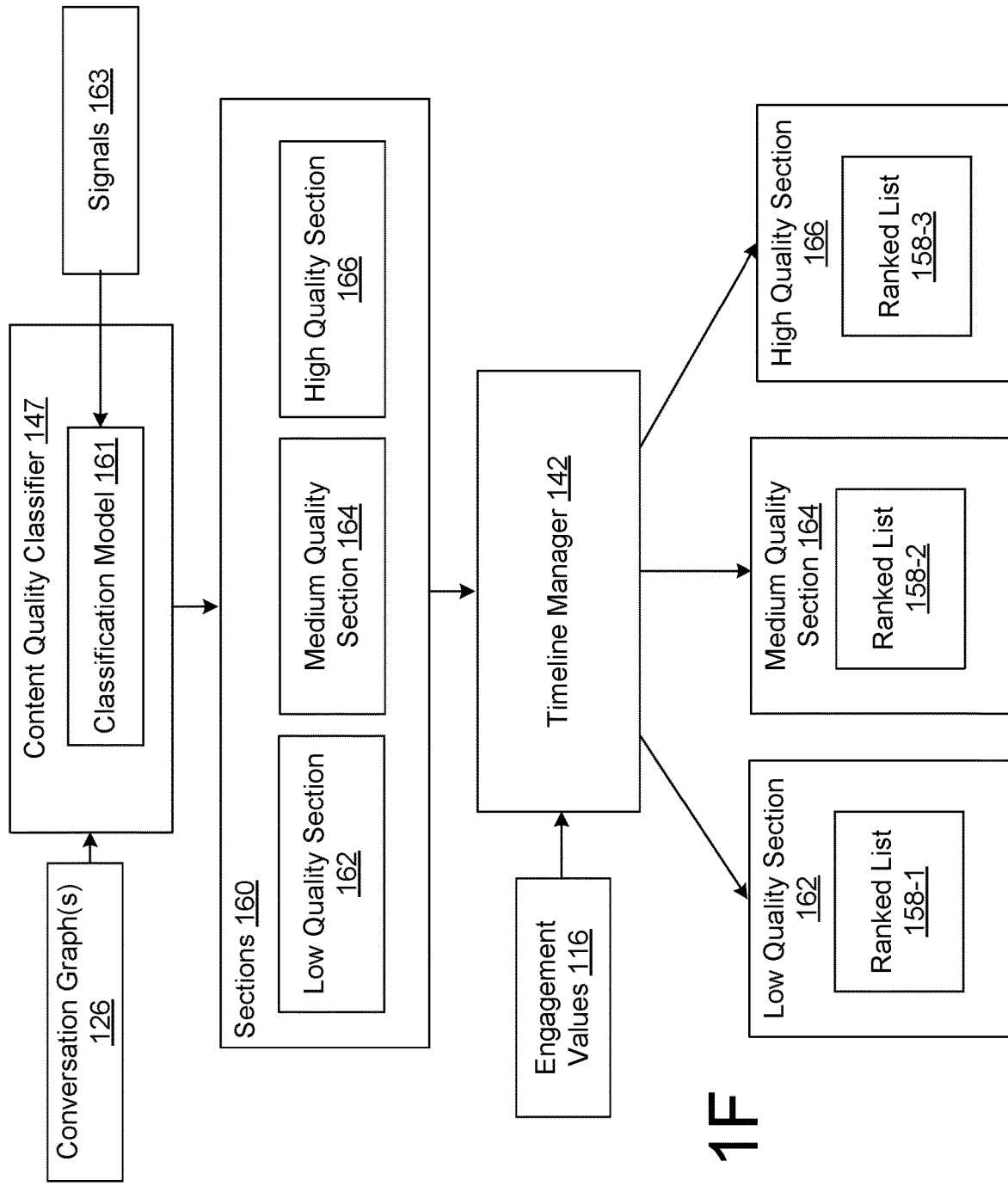
FIG. 1F illustrates an example of a two-level ranking mechanism that includes a content quality classifier according to an aspect.

As shown with respect to FIGS. 1A and 1F, in some examples, the messaging platform 104 may include a content quality classifier 147 configured to classify (e.g., section) the messages of the conversation graph 126 into a plurality of sections 160 based on content quality of the messages. The content quality of the messages may include abusive (or toxic) probabilities (or confidences) at the message level or author level. In some examples, the content quality classifier 147 may determine (or receive) an abusive probability for a particular message (e.g., which may be based on the probability that the content itself may be abusive or the author or account that generates the message may be linked to abusive behavior on the platform). If the abusive probability is relatively high (or the confidence level that the message and/or author is considered abusive is relatively high), the content quality classifier 147 may classify the message into one section 160 (e.g., a low quality or abusive section), or if the abusive probability is relatively low (or the confidence level that the message and/or author is considered abusive is relatively low), the content quality classifier 147 may classify the message into another section 160 (e.g., a high quality or non-abusive section). In other words, the content quality classifier 147 is configured to divide the nodes 128 (or the branches 132) of the conversation graph 126 into the sections 160. Each section 160 may refer to a different categorization (or classification) of quality level (or abusive (or toxic) level). The content quality classifier 147 may determine that a first message has a relatively low quality and a second message has a relatively high quality, where the content quality classifier 147 may assign the first message (or a branch 132 that includes the first message) to a first section (e.g., the first section being considered a low quality section), and may assign the second message (or a branch 132 that includes the second message) to a second section (e.g., the second section being considered a high quality section).

The classification or sectioning performed by the content quality classifier 147 may be considered the first part (e.g., the hard ranking) of the two-level ranking mechanism. In some examples, the sections 160 may include at least two different sections, each of which represents a separate quality category or classification. In some examples, the sections 160 includes a low quality section 162, a medium quality section 164, and a high quality section 166. In some examples, the term section may refer category or classification. Although three sections 160 are depicted in FIG. 1F, the sections 160 may include any number of sections including two sections or any number greater than three sections. After classifying by the content quality classifier 147, the low quality section 162 includes or identifies nodes 128 (or branches 132) from the conversation graph 126 that are determined to be low quality, the medium quality section 164 includes or identifies nodes 128 (or branches 132) from the conversation graph 126 that are determined to be medium quality, and the high quality section 166 includes or identifies nodes 128 (or branches 132) from the conversation graph 126 that are determined to be high quality. In some examples, the medium quality section 164 includes messages that might be abusive or there is a probability that the account posting the message may be linked to abusive behavior with medium confidence. In some examples, low quality section 162 includes messages that is highly likely to be judged as abusive if reported by a bystander and reviewed or it contains an untrusted link or the account posting the message has been linked to abusive behavior with a high probability.

In some examples, the content quality classifier 147 includes a classification model 161 (or multiple models) that classifies the nodes 128 (or the branches 132) of the conversation graph 126 into the sections 160. In some examples, the classification model 161 is a machine learning model that is trained using training data applied to one or more machine learning algorithms. In some examples, the classification model 161 includes a neural network. The training data may be obtained over a period of time (e.g., a day, week, month, year, etc.), and then used to train (or re-train) the classification model 161 in an offline mode, where the updated classification model 161 is transmitted to the content quality classifier 147.

The content quality classifier 147 may obtain one or more signals 163 related to the classification model 161 and input the signals 163 to the classification model 161 to determine which messages of the conversation graph 126 should be classified into the low quality section 162, the medium quality section 164, or the high quality section 166. For a particular message (e.g., node 128) of the conversation graph 126, the output of the classification model 161 may identify the quality classification, e.g., either the low quality section 162, the medium quality section 164, or the high quality section 166. In some examples, the nodes 128 (or the branches 132) of the conversation graph 126 are annotated with the section 160 (or classification) determined by the classification model 161. In some examples, the content quality classifier 147 stores the classification of the nodes 128 (or the branches 132) in a data store on the messaging platform 104.

In order to classify a particular message of the conversation graph 126, in some examples, the signals 163 include one or more signals generated by the client application 154 and/or one or more signals generated by the messaging platform 104. In some examples, the signals 163 include one or more signals that are different from the signals 106 used to determine the predictive outcomes 118. In some examples, the signals 163 include one or more signals representing the content of the message. In some examples, the signals 163 include one or more signals representing user history of the author that created the content. In some examples, the signals 163 include one or more signals modeling a user profile of the author that created the content. In some examples, the signals 163 include one or more signals modeling the author's behavior on the messaging platform 104. In some examples, the signals 163 may include signals representing the message text, the behavior history of the user such as the logging history, the type of device the user is using, how many times they have been reported as abusive, etc. Based on these signals 163, the content quality classifier 147 may predict if a message is abusive and/or a user is abusive. Once those probabilities (or confidences or scores) are determined, the content quality classifier 147 can make sectioning decisions. For example, if the message is abusive with high confidence and the user that wrote it is also abusive with high confidence then the content quality classifier 147 may classify the message in the worst quality section, e.g., the low quality section 162.

In some examples, the content quality classifier 147 may receive a message identifier of the message and/or a user identifier of the author that created the content, and, in response to the message identifier and/or the user identifier, the content quality classifier 147 may obtain the signals 163 to be inputted to the classification model 161. In some examples, the content quality classifier 147 may use the message identifier to obtain the content of the message from the message repository 138. In some examples, instead of receiving the message identifier, the content quality classifier 147 may receive the content of the message. In some examples, the content quality classifier 147 may use the user identifier to obtain one or more signals pertaining to the author by communicating with one or more data services 165 in any manner as explained with reference to FIG. 1C. In some examples, the classification of the message into one of the sections 160 may be performed at the time of message creation. In some examples, the classification of the message is performed at (or around) the time of receipt of the conversation view request 121. In some examples, the content quality classifier 147 may convert the signals 163 to a format compatible with the classification model 161.

In some examples, the timeline manager 142 and/or the prediction manager 110 may communicate with the content quality classifier 147 over a server communication interface (e.g., a thrift call, REST call, GraphQL request, etc.), where the message identifier and/or the user identifier is transmitted to the content quality classifier 147, and the content quality classifier 147 annotates the node 128 (or the branch 132) of the conversation graph 126 with the determined classification and/or returns the classification to the service requesting the classification information via the server communication interface. The content quality classifier 147 may provide the signals 163 to the predictive model(s) 161 to determine whether the message has a content quality corresponding to the low quality section 162, the medium quality section 164, or the high quality section 166. In some examples, unlike the predictive outcomes 118, the classification of the messages into the sections 160 are not personalized to the user associated with the conversation view request 121.

In response to the conversation view request 121, as previously discussed above, the timeline manager 142 may control the prediction manager 110 to generate the predictive outcomes 118 for each message (or a subset thereof) of the conversation graph 126 and compute an engagement value 116 for each message based on the predictive outcomes 118. For example, the engagement predictor 125 may obtain signals 106 related to the prediction and input the signals 106 to the predictive models 112 to determine the predictive outcomes 118 for each message (or a subset of messages) in the conversation graph 126. In some examples, the predictive outcomes 118 includes a reciprocal engagement probability 124. In some examples, the predictive outcomes 118 includes a reciprocal engagement probability 124, and at least one of a positive engagement probability 120 or a negative engagement probability 122. In some examples, the predictive outcomes 118 include the reciprocal engagement probability 124, the positive engagement probability 120, and the negative engagement probability 122.

The engagement scorer 114 may compute an engagement value 116 for a respective message using the predictive outcomes 118 (e.g., combining the predictive outcomes 118 to generate the engagement value 116). Then, the engagement values 116 are used by the timeline manager 142 to separately rank the messages in the low quality section 162, the medium quality section 164, and the high quality section 166.

In some examples, the timeline manager may receive the list of messages classified as the low quality section 162 from the content quality classifier 147, the list of messages classified as the medium quality section 164 from the content quality classifier 147, and the list of messages classified as the high quality section 166 from the content quality classifier 147. Also, the timeline manager may receive the engagement values 116 from the prediction manager 110. The ranking of the messages within a particular section 160 using the engagements values 116 for the messages within a respective section 160 may be considered the second part of the two-level ranking mechanism of FIG. 1F. In some examples, the second part of the two-level ranking mechanism may be considered a soft ranking of the messages.

In some examples, the timeline manager 142 may generate a first ranked list 158-1 of messages classified in the low quality section 162, which have been ranked using the engagement values 116 from the prediction manager 110. In some examples, the first ranked list 158-1 includes branches 132 of the conversation graph 126 classified as low quality, and the branches 132 are ranked within the low quality section 162 according to their engagement values 116. The timeline manager 142 may generate a second ranked list 158-2 of messages classified in the medium quality section 164, which have been ranked using the engagement values 116 from the prediction manager 110. In some examples, the second ranked list 158-2 includes branches 132 of the conversation graph 126 classified as medium quality, and the branches 132 are ranked within the medium quality section 164 according to their engagement values 116. The timeline manager 142 may generate a third ranked list 158-3 of messages classified in the high quality section 166, which have been ranked using the engagement values 116 from the prediction manager 110. In some examples, the third ranked list 158-3 includes branches 132 of the conversation graph 126 classified as high quality, and the branches 132 are ranked within the high quality section 166 according to their engagement values 116.

The timeline manager 142 may transmit at least a subset of the messages of the high quality section 166 according to the rank (e.g., transmit at least a portion of the third ranked list 158-3) to be rendered on the client application 154. In this manner, the user of the client application 154 may view the messages that are considered high quality which are also ranked according to their engagement values 116. The timeline manager 142 may request subsequent request(s) to view additional messages from the conversation graph 126, where the timeline manager 142 may transmit at least a portion of the second ranked list 158-2, followed by at least a portion of the first ranked list 158-1.

In some examples, the timeline manager 142 ranks the messages of the conversation graph 126 according to the order of the third ranked list 158-3, the second ranked list 158-2, and then followed by the first ranked list 158-1. As such, the client application 154 first renders messages from the high quality section 166 that are ranked according to the engagement values 116, renders messages from the medium quality section 164 that are ranked according to the engagement values 116, and lastly renders messages from the low quality section 162 that are ranked according to the engagement values 116. If the high quality section 166 includes ten messages, the medium quality section 164 includes ten messages, and the low quality section 162 includes ten messages, and if the displayed message threshold is fifteen, the client application 154 renders the entire third ranked list 158-3 and five messages of the second ranked list 158-2. The timeline manager 142 may receive a request to display additional messages of the conversation graph 126, where the timeline manager 142 may transmit the other five messages of the second ranked list 158-2 followed by the first ranked list 158-1.

In some examples, the hard ranking can be personalized by using the output of the predictive models 112 to perform the hard ranking. For example, the prediction manager 110 may determine the predictive outcomes 118 and the engagement values 116 as discussed above. The content quality classifier 147 may use the outputs of the prediction manager 110 to classify (and/or rank) the messages according to the hard ranking techniques such that the hard ranking is personalized from the perspective of the user that initiated the conversation view request 121.

Figure 2:
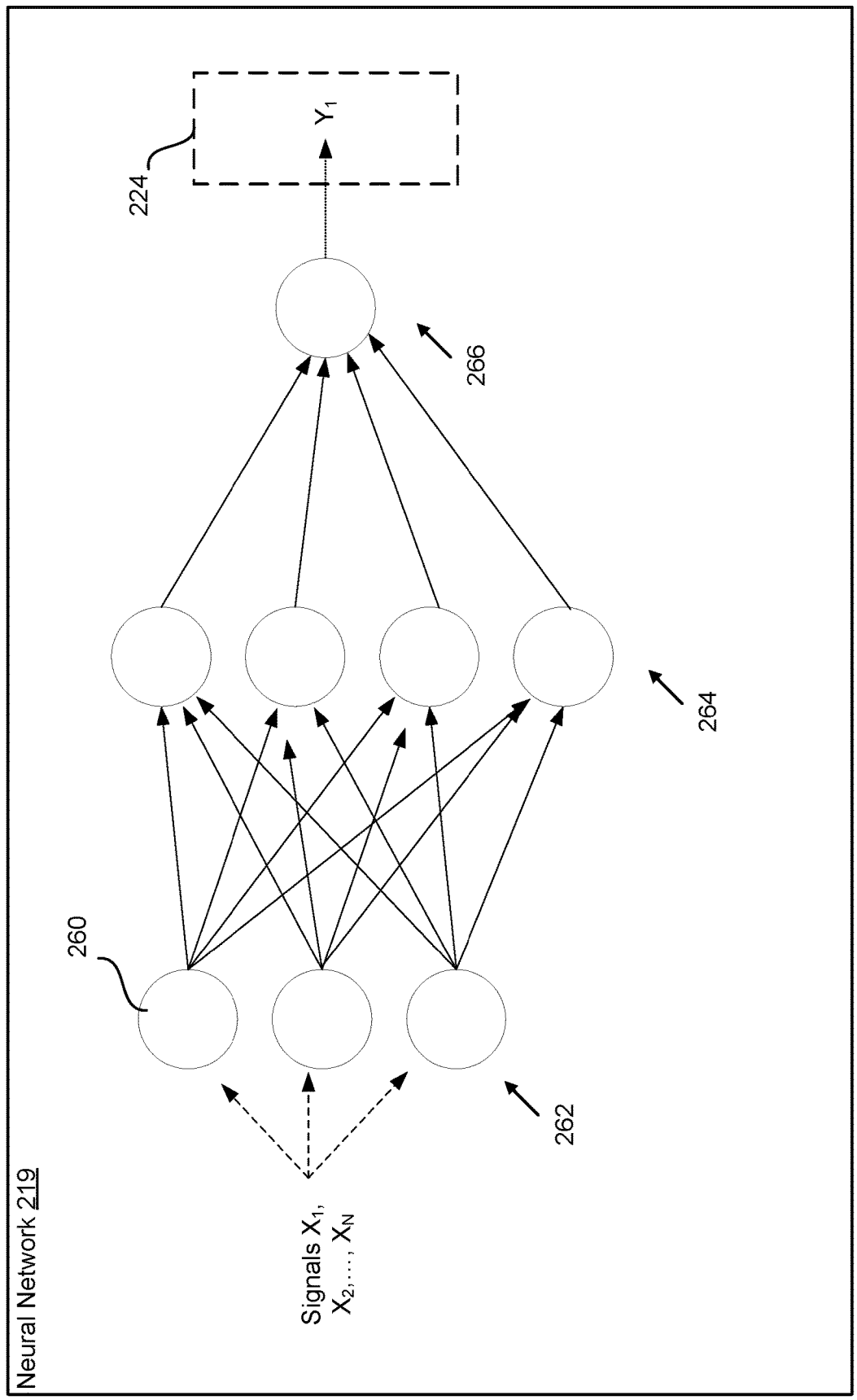
FIG. 2 illustrates an example of a predictive model as a neural network according to an aspect.

FIG. 2 illustrates a neural network 219 according to an aspect. The neural network 219 may be an example of the reciprocal engagement model 119 of the messaging system 100 of FIGS. 1A through 1D. However, the features discussed with respect to FIG. 2 may be applied to any of the predictive models 112 including the positive engagement model 115 and the negative engagement model 117. In some examples, the neural network 219 may be an example of the classification model 161 of FIG. 1F. The neural network 219 is configured to output a reciprocal engagement probability 224. The reciprocal engagement probability 224 may be an example of the reciprocal engagement probability 124 of FIG. 1A. The neural network 219 may be an interconnected group of nodes 260, where each node 260 represents an artificial neuron. The nodes 260 are connected to each other in layers, with the output of one layer becoming the input of a next layer. The neural network 219 transforms an input $X_1$, $X_2$ through $X_N$ (e.g., the signals 106), received by an input layer 262, transforms it through one or more hidden layers 264 (e.g., FIG. 2 illustrates one hidden layer 264), and produces an output $Y_1$ (e.g. the reciprocal engagement probability 124) via an output layer 266. Each layer is made up of a subset of the set of nodes 260.

Using the neural network 219 to obtain the reciprocal engagement probability 224 may involve applying weighted and biased numeric input to interconnected nodes 260 in the neural network 219 and computing their output. The weights and bias applied to each node 260 in the neural network 219 may be obtained by training the neural network 219 using, for example, machine learning algorithms 149 (e.g., by the predictive model trainer 140 of FIG. 1A). The nodes 260 in the neural network 219 may be organized in two or more layers including at least the input layer 262 and the output layer 266. For a multi-layered neural network 219, the output from one layer may serve as input to the next layer. The layers with no external output connections may be referred to as the hidden layers 264. The output of each node 260 is a function of the weighted sum of its inputs plus a bias.

To obtain the reciprocal engagement probability 224, a vector of feature values $(X_1 \ldots X_N)$ is applied as the input to each node 260 in the input layer 262. In some examples, the vector of feature values $(X_1 \ldots X_N)$ includes the values of the signals 106 explained above. The input layer 262 distributes the values to each of the nodes 260 in the hidden layer 264. Arriving at a node 260 in the hidden layer 264, the value from each input node is multiplied by a weight, and the resulting weighted values are summed together and added to a weighted bias value producing a combined value. The combined value is passed through a transfer or activation function, which outputs a value. Next, the outputs from the hidden layer 264 are distributed to the node 260 in the output layer 266 of the neural network 219. Arriving at a node 260 in the output layer 266, the value from each hidden layer node is multiplied by a weight, and the resulting weighted values are summed together and added to a weighted bias value to produce a combined value. The combined value is passed through the transfer or activation function, which output $Y_1$ (e.g., the reciprocal engagement probability 224).

Figure 3:
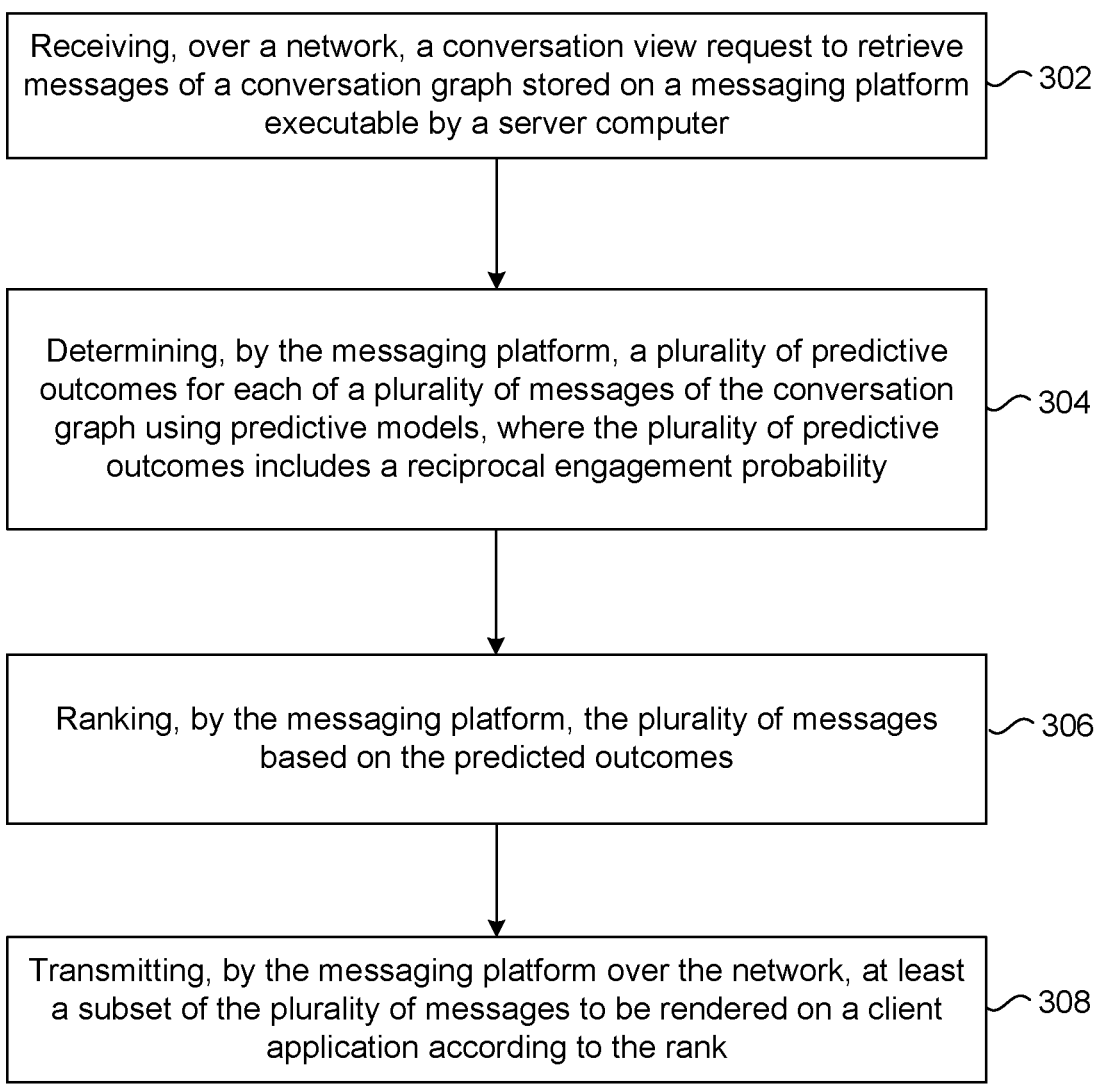
FIG. 3 illustrates a flowchart depicting example operations of the messaging system according to an aspect.

FIG. 3 illustrates a flowchart 300 depicting example operations of a messaging platform for ranking messaging of a conversation graph according to an aspect.

Operation 302 includes receiving, over a network 150, a conversation view request 121 to retrieve messages of a conversation graph 126 stored on a messaging platform 104 executable by a server computer 102. Operation 304 includes determining, by the messaging platform 104, a plurality of predictive outcomes 118 for each of a plurality of messages of the conversation graph 126 using predictive models 112, where the plurality of predictive outcomes 118 includes a reciprocal engagement probability 124. Operation 306 includes ranking, by the messaging platform 104, the plurality of messages based on the predictive outcomes 118. Operation 308 includes transmitting, by the messaging platform 104 over the network 150, at least a subset of the plurality of messages to be rendered on a client application 154 according to the rank.

FIG. 4 illustrates a flowchart 400 depicting example operations of a messaging platform for ranking messages of a conversation graph according to an aspect.

Operation 402 includes receiving, over a network 150, a conversation view request 121 to retrieve messages of a conversation graph 126 stored on a messaging platform 104 executable by a server computer 102. Operation 404 includes determining, by the messaging platform 104, a plurality of predictive outcomes 118 for each of a plurality of messages of the conversation graph 126 using predictive models 112. The determining step may include obtaining a plurality of signals 106 relevant to the predictive models 112, where the plurality of signals includes data structure-related signals 101 relating to the conversation graph 126 and inputting the plurality of signals 106 to the predictive models 112 to determine the plurality of predictive outcomes 118. Operation 406 includes ranking, by the messaging platform 104, the plurality of messages based on the predictive outcomes 118. Operation 408 includes transmitting, by the messaging platform 104 over the network 150, at least a subset of the plurality of messages to be rendered on a client application 154 according to the rank.

FIG. 5 illustrates a flowchart 500 depicting example operations of a messaging platform for ranking messaging of a conversation graph according to an aspect.

Operation 502 includes classifying, by a messaging platform 104, messages of a conversation graph 126 into a plurality of sections 160 based on content quality of the messages, where the plurality of sections 160 include a first section and a second section. The first section has messages from the conversation graph 126 determined as higher quality than messages of the second section. Operation 504 includes determining, by the messaging platform 104, a plurality of predictive outcomes 118 for each of a plurality of messages of the conversation graph 126 using predictive models 112. Operation 506 includes ranking, by the messaging platform 104, the messages of the first section based on the predictive outcomes 118 for the messages of the first section. Operation 508 includes transmitting, by the messaging platform 104, at least a subset of the messages of the first section to be rendered on a client application 154 according to the rank.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A method for ranking messages of conversation graphs in a messaging platform using machine-learning signals, the method comprising:
   receiving, at a messaging platform, over a network, a conversation view request to retrieve messages of a conversation graph from a user device;
   predicting, by the messaging platform, at least one engagement probability for each of a plurality of messages of the conversation graph using at least one predictive model, including:
   obtaining a plurality of machine-learning (ML) signals relevant to the at least one predictive model, the plurality of ML signals including data structure-related signals relating to the conversation graph; and
   inputting the plurality of ML signals to the at least one predictive model to predict a plurality of predictive outcomes including a negative engagement probability and a positive engagement probability;
   computing an engagement value for each of the plurality of messages using the plurality of predictive outcomes;
   ranking, by the messaging platform, the plurality of messages based on the engagement values; and
   transmitting, by the messaging platform over the network, at least a subset of the plurality of messages to be rendered on a client application according to the rank.

2. The method of claim 1, wherein the conversation graph includes a tree data structure having a plurality of nodes that represent the messages of the conversation graph and edges that represent links between the nodes, the tree data structure defining one or more branches of nodes.

3. The method of claim 2, wherein the data structure-related signals include a number of replies within a branch, a number of conversations within a branch, and a number of unique authors within a branch or the conversation graph.

4. The method of claim 2, wherein the data structure-related signals include signals representing a number of the plurality of nodes and a number of the branches within the conversation graph.

5. The method of claim 1, wherein the plurality of ML signals include engagement signals representing user engagement data associated with the messages of the conversation graph, the user engagement data including engagements of users that are connected to a user of the client application in a connection graph.

6. The method of claim 1, wherein the plurality of ML signals include historical aggregate signals including engagement data associated with a user of the client application on the messaging platform.

7. The method of claim 1, wherein the plurality of ML signals include content-related signals associated with messages of the conversation graph.

8. The method of claim 1, wherein the engagement value is computed for each of the plurality of messages using the positive engagement probability and the negative engagement probability.

9. The method of claim 1, further comprising:
   obtaining, by the messaging platform, training data from a client event log that stores information received from the client application and an injection log that stores information from a timeline manager executing on the messaging platform; and
   training, by the messaging platform, the at least one predictive model based on a machine learning algorithm inputted with the training data.

10. A system for ranking messages of conversation graphs in a messaging platform using machine-learning signals, the system including:
    a conversation graph manager configured to generate a conversation graph based on a reply structure of messages exchanged on a messaging platform, the conversation graph including a data structure of messages of a conversation;
    a timeline manager configured to provide a stream of messages, over a network, in a social timeline of a user on a client application, the timeline manager configured to receive a conversation view request, over the network, from the client application executable by a user device;
    an engagement predictor configured to predict, in response to the conversation view request, a plurality of predictive outcomes for each of a plurality of messages of the conversation graph using at least one predictive model, the plurality of predictive outcomes including a positive engagement probability and a negative engagement probability,
    the engagement predictor configured to obtain a plurality of machine-learning (ML) signals relevant to the at least one predictive model, the engagement predictor configured to input the plurality of ML signals to the at least one predictive model to predict the plurality of predictive outcomes; and
    an engagement scorer configured to compute an engagement value for each of the plurality of messages using the predictive outcomes for a respective message,
    the timeline manager configured to rank the plurality of messages using the engagement values, and provide, over the network, at least a subset of the plurality of messages to be rendered on the social timeline according to the rank.

11. The system of claim 10, wherein the plurality of ML signals includes data structure-related signals relating to the conversation graph, the data structure-related signal including signals representing a number of replies within a branch, and a number of conversations within a branch between a user of the client application and an author of a root message.

12. The system of claim 10, wherein the engagement predictor is configured to obtain one or more first ML signals from a first data service executing on the messaging platform and obtain one or more second ML signals from a second data service executing on the messaging platform.

13. The system of claim 10, wherein the plurality of ML signals include at least one health-related signals, engagement signals, social graph signals, historical aggregate signals, or content-related signals.

14. The system of claim 10, wherein the plurality of predictive outcomes also include a reciprocal engagement probability, the reciprocal engagement probability including a probability value that the messaging platform is predicted to receive a reply to a respective message.

15. The system of claim 10, further comprising:
a predictive model trainer configured to periodically train the at least one predictive model based on one or more machine learning algorithms inputted with training data, the predictive model trainer configured to provide the at least one trained predictive model to the prediction manager.

16. The system of claim 10, wherein the plurality of ML signals include signals generated by the client application and signals generated by the messaging platform.

17. The system of claim 10, wherein the plurality of ML signals include similarity signals, the similarity signals representing a level of similarity between a particular message and one or more messages in which a user of the client application has engaged with.

18. A non-transitory computer-readable medium storing executable instructions that when executed by at least one processor are configured to cause the at least one processor to:
receive, at a messaging platform, over a network, a conversation view request for messages of a conversation graph from a user device, the conversation graph including a data structure of messages of a conversation;
select a candidate subset of messages from the conversation graph;
predict a plurality of predictive outcomes for each message of the candidate subset using at least one predictive model, including:
obtain a plurality of machine-learning (ML) signals including data structure-related signals relating to the conversation graph; and
input the plurality of ML signals to the at least one predictive model to determine the plurality of predictive outcomes, the plurality of predictive outcomes including a positive engagement probability and a negative engagement probability;
compute an engagement value for each message of the candidate subset using the predictive outcomes;
rank the plurality of messages using the engagement values; and
transmit at least a subset of the plurality of messages to be rendered on a client application according to the rank.

19. The non-transitory computer-readable medium of claim 18, further comprising:
obtain training data from a client event log that stores information received from the client application and an injection log that stores information from a timeline manager executing on the messaging platform; and
train the at least one predictive model based on a machine learning algorithm inputted with the training data.

20. The non-transitory computer-readable medium of claim 18, wherein the at least one predictive model includes at least one neural network.

* * * * *